US005575450A

United States Patent [19]

Lee

[11] Patent Number: 5,575,450
[45] Date of Patent: Nov. 19, 1996

[54] MONITOR TILTING DEVICE

[75] Inventor: Nam-soo Lee, Iujungbu, Rep. of Korea

[73] Assignee: Inkel Corporation, Seoul, Rep. of Korea

[21] Appl. No.: 450,414

[22] Filed: May 25, 1995

Related U.S. Application Data

[62] Division of Ser. No. 186,692, Jan. 24, 1994, Pat. No. 5,520,361.

[30] Foreign Application Priority Data

| Apr. 20, 1993 | [KR] | Rep. of Korea | 93-6642 |
| Oct. 26, 1993 | [KR] | Rep. of Korea | 93-22077 |
| Oct. 26, 1993 | [KR] | Rep. of Korea | 93-22078 |

[51] Int. Cl.$^6$ ............................................. H05K 5/00
[52] U.S. Cl. ........................... 248/688; 248/371; 248/923; 361/682
[58] Field of Search ........................... 248/688, 371, 248/917, 923, 291.1, 292.13; 108/7; 361/681, 682

[56] References Cited

U.S. PATENT DOCUMENTS

| 4,113,212 | 9/1978 | Coriden ................................ 248/688 X |
| 4,516,508 | 5/1985 | Kako et al. .............................. 108/7 |
| 4,524,940 | 6/1985 | Yurchenko et al. ................... 248/923 X |
| 4,556,189 | 12/1985 | Kirpluk et al. ....................... 248/923 X |
| 4,693,444 | 9/1987 | Williams et al. ..................... 248/923 X |
| 4,735,394 | 4/1988 | Facco .................................... 248/923 X |
| 4,769,634 | 9/1988 | Killian, Jr. et al. ................. 248/923 X |
| 4,790,504 | 12/1988 | Wills et al. .......................... 248/923 X |
| 4,807,842 | 2/1989 | Freni, Jr. et al. ................... 248/371 X |
| 5,379,274 | 1/1995 | Lee ....................................... 248/371 X |

*Primary Examiner*—Alvin C. Chin-Shue
*Assistant Examiner*—Derek J. Berger
*Attorney, Agent, or Firm*—Head, Johnson & Kachigian

[57] ABSTRACT

A monitor tilting device capable of tilting the monitor using one hand. In an embodiment, the device comprises a cabinet bottom having a tilting opening at its rear lower surface, a monitor tilting member rotatably downwardly received in the tilting opening, a sliding washer rotatably receiving the upper section of the tilting member, and a torsion spring member elastically supporting the tilting member for supporting a tiled position of the monitor. In another embodiment, the device comprises a bracket integrally formed on the bottom surface of the monitor and a tilting member rotatably engaged with this bracket. In a further embodiment, the device comprises a monitor stand having a sliding depression, a sliding washer slidably coupled to an insert member of the sliding depression, and a bottom surface of the monitor fixedly coupled to the sliding washer. The monitor tilting device of this invention easily achieves the monitor tilting operation by simply pushing the monitor backwards using one hand, and causes easy fabrication of the monitor.

2 Claims, 34 Drawing Sheets

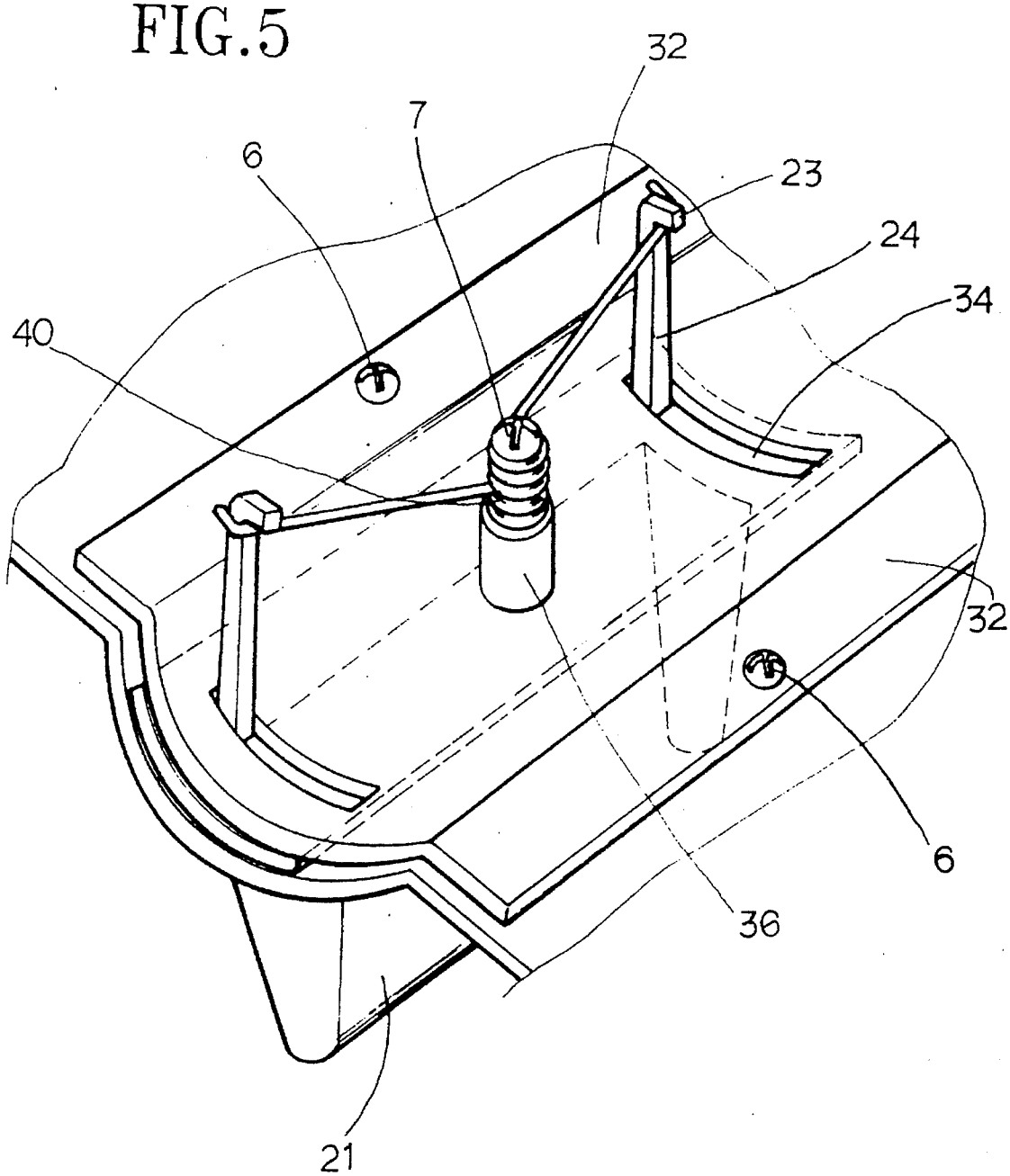

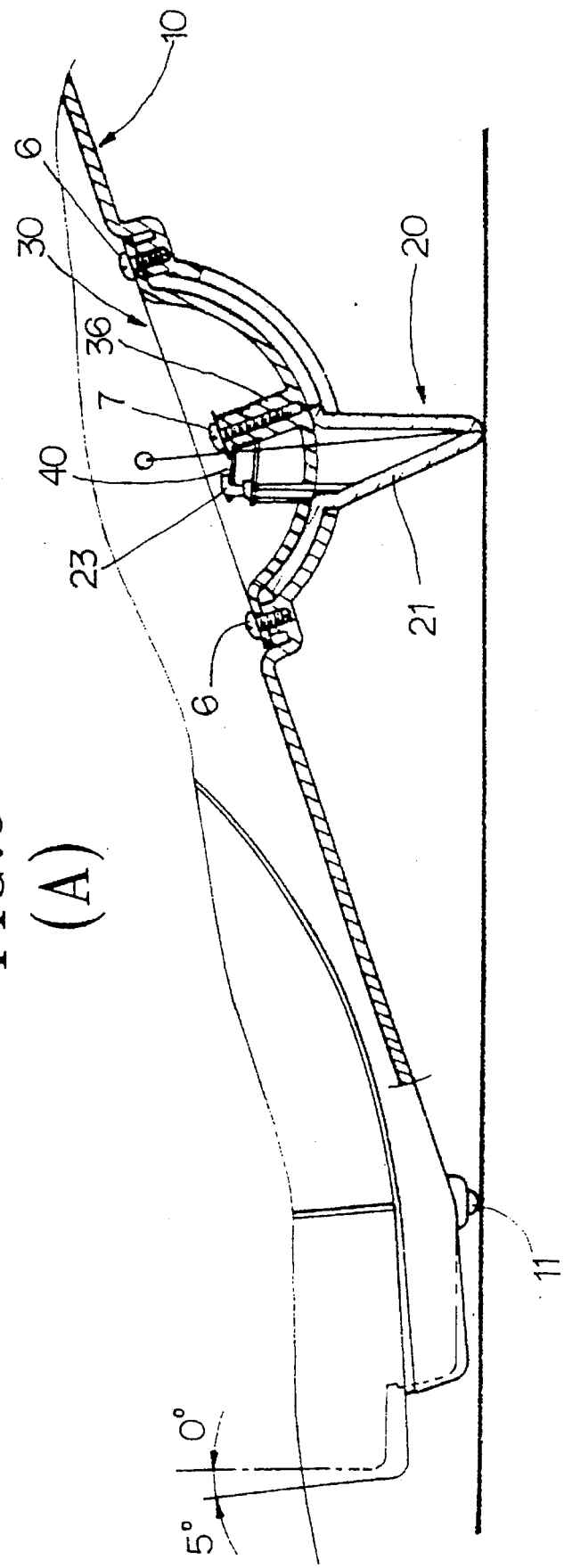

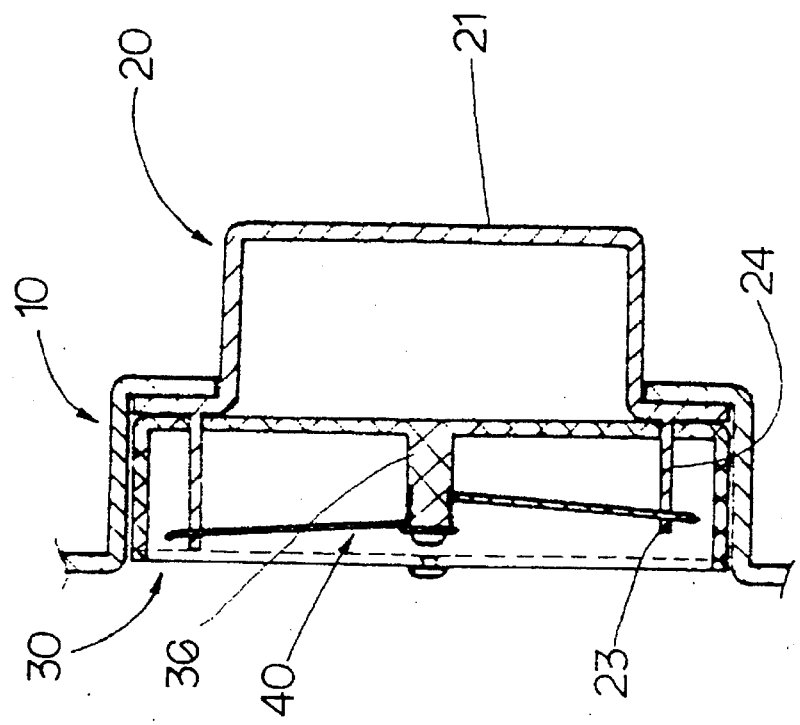
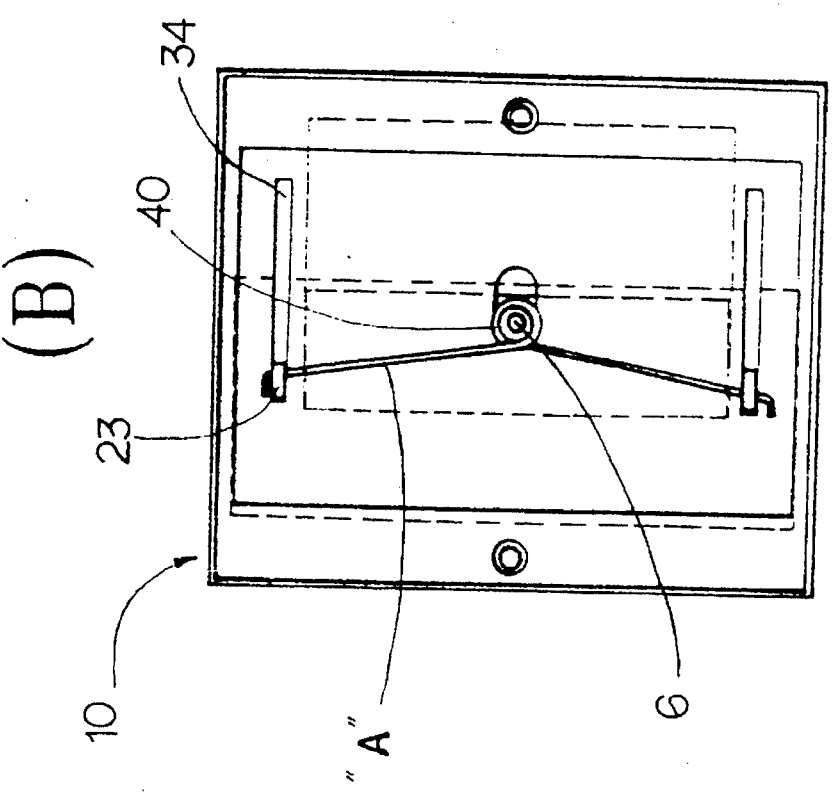

(A)

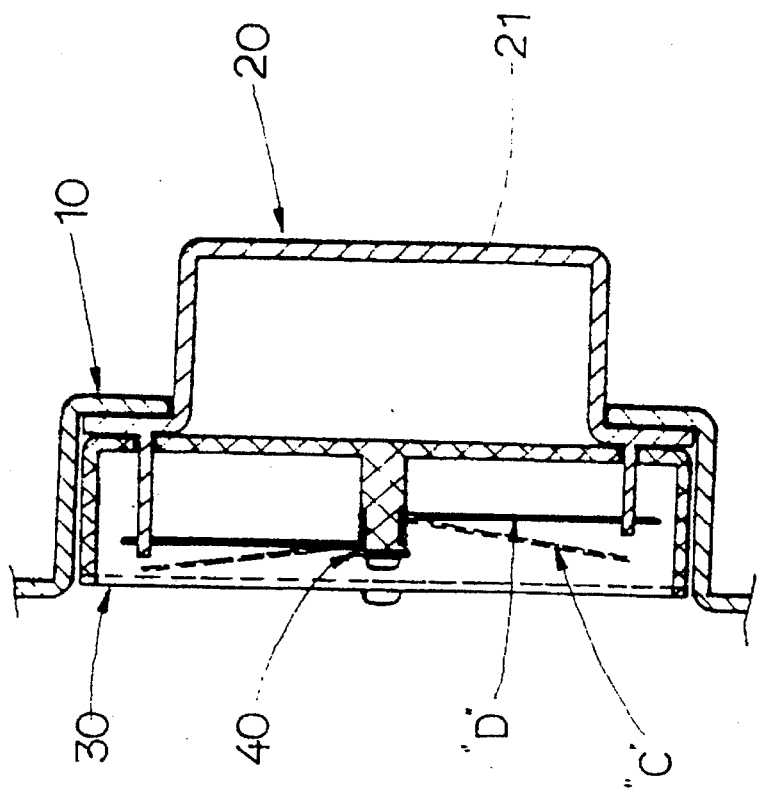
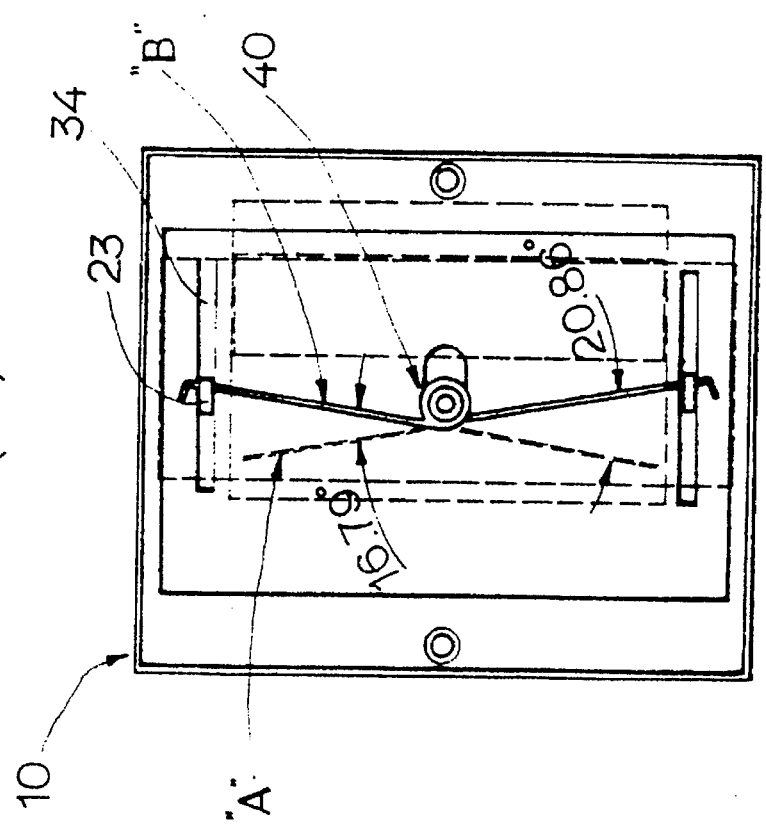
FIG. 10 (B)
FIG. 10 (C)

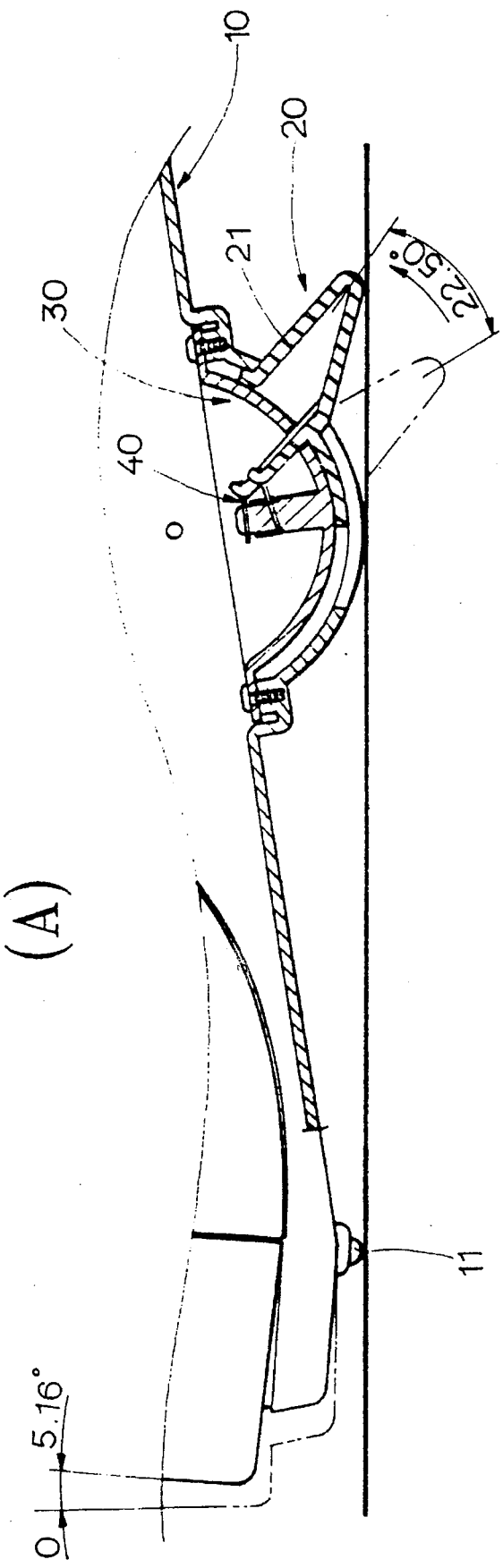

(A)

(B)

(C)

(A)

(B)

MONITOR TILTING DEVICE

This is a divisional application of application Ser. No. 08/186,692 filed Jan. 24, 1994 now U.S. Pat. No. 5,520,361 entitled "MONITOR TILTING DEVICE".

BACKGROUND OF THE INVENTION

1. Field of the Invention

The present invention relates in general to a structure of an electronic displaying equipment, that is, a monitor, and more particularly to a device for tilting the monitor.

2. Description of the Prior Art

FIG. 1 is a perspective view of a conventional monitor assembly and FIG. 2 is a sectional view of a conventional monitor tilting structure between a monitor body and a monitor stand, and FIG. 3 is a schematic side view showing reflection of light by the monitor screen in the case of use of the conventional monitor assembly as being placed on a personal computer. As shown in these drawings, a dome-shaped sliding part 3 of the lower surface of the monitor body 1 is laid on a slide support part of the stand 2 such that it slides over the slide support part of the stand 2 in order to adjust the angle of monitor body 1 with respect to the stand 2. Here, in order to achieve the slidable connection of the sliding part 3 to the stand 2, a sliding washer 4 is screwed by screws 5 to the slide support part of the stand 2 inserted into an opening of the sliding part 3 in such a manner that the monitor body 1 is allowed to slide over the stand 2.

However, in this conventional monitor tilting structure, the sliding washer 4 should be screwed to the stand 2 with interposition of the dome-shaped sliding part 3 therebetween prior to fabrication of the elements of the monitor body 1. In this regard, the preparation process for the monitor assembly is complicated and results in increase of the cost.

The conventional monitor assembly having the above monitor tilting structure should be provided with the additional stand 2, thus to increase the cost of the monitor. The above monitor tilting structure requires a considerable tilting force, so that the desired angular adjustment of the monitor body 1 with respect to the stand 2 is not achieved using one hand. Another disadvantage of the conventional monitor assembly having the above tilting structure is resided in that the height of the screen of the monitor body 1 is heightened by the height of the stand 2 when the monitor is used while being placed on a personal computer due to a spacial limit, thus to introduce inconvenience to the user. Furthermore, the heightening of height of the monitor screen also causes a fatigue of user's eye due to the reflection of light by the screen as shown in FIG. 3.

In an effort to overcome the aforementioned problems, there have been proposed varieties of monitor tilting mechanisms such as disclosed in U.S. Pat. Nos. 4,524,940, 4,556, 189, 4,746,087 and 4,769,634. However, the mechanisms disclosed in the above U.S. Patents still have disadvantages in that they have complex constructions, are attended with inconvenience in their fabrications, and require a considerable tilting force such that the desired angular adjustment of the monitor can not be achieved using one hand.

SUMMARY OF THE INVENTION

It is, therefore, an object of the present invention to provide a monitor tilting device in which the aforementioned problems can be overcome and which allows a desired angular adjustment of the monitor to be easily achieved using one hand, and has no additional stand, thus to reduce the cost of the monitor.

It is another object of the present invention to provide a monitor tilting device which levels the height of the monitor screen with user's eye when the monitor is used while being placed on a personal computer, and prevents the reflection of light by the screen causing a fatigue of the user's eye.

It is still another object of the present invention to provide a monitor tilting device which is included in a monitor stand and separately coupled to a fully fabricated monitor, thus to simplify the fabrication process of the monitor and to reduce the cost.

In accordance with a primary embodiment of the present invention, the aforementioned objects can be accomplished by providing a monitor tilting device comprising a cabinet bottom, the cabinet bottom being provided on its front lower surface with a lower protrusion acting as a point of the center of gravity of the monitor, and provided on its rear lower surface with a pair of fixing bosses, a sliding part formed between the bosses, and a tilting opening defined on the center of the sliding part; monitor tilting means for elastically levering about sliding washer means in order to tilt a monitor, the tilting means including a tilting lever downwardly inserted into the tilting opening of the cabinet bottom, an arc-shaped sliding surface provided on a top of the tilting lever, and a pair of turning guiders extending upwards from the sliding surface and each having a hook on its top; the sliding washer means mounted on the cabinet bottom, the washer means including a flange surface having an opposed pair of fixing holes corresponding to the fixing bosses of the cabinet bottom, an arc-shaped sliding part corresponding to the arc-shaped sliding surface of the monitor tilting means and surrounded by the flange surface, a pair of guide slits formed on the sliding part for receiving and guiding the turning guiders of the monitor tilting means, respectively, and a protrusion vertically extending from an upper center surface of the sliding part and having a fixing boss on its top; and spring means for elastically supporting the monitor tilting means in order to support a tilted position of the monitor, the spring means being mounted on the protrusion of the sliding washer means and engaged with the hooks of the turning guiders of the monitor tilting means.

In accordance with a second embodiment, the present invention provides a monitor tilting device comprising a front case including a cathode ray tube therein; a cabinet bottom, the cabinet bottom including a lower protrusion provided on a front lower surface of the cabinet bottom for acting as a point of the center of gravity of the monitor, a stationary support leg provided on a rear lower surface of the cabinet bottom for supporting the rear section of the bottom, a front sliding support shoulder, and an opposed pair of sliding side walls, each of the side walls extending upwards from each side of an inner surface of the cabinet bottom and having an arc-shaped sliding surface at its front edge, the sliding surface being bent backwards at its outer side in order to form an arc-shaped side surface and to define a slide guide groove; a rear case slidably engaged with the cabinet bottom for tilting a monitor, the rear case including an arc-shaped sliding edge slidably engaged with the slide guide groove of the cabinet bottom, a lower shoulder extending forwards from a top of the sliding edge for limiting a backward tilting of the monitor in cooperation with a top of a corresponding side wall of the cabinet bottom, a first sliding surface extending outwards from the sliding edge, a boss mounted on the first sliding surface at a position under the lower shoulder, a second sliding surface extending inwards from the lower shoulder, and an upper shoulder extending backwards from a lower end of the second sliding surface for limiting a forward tilting of the monitor in cooperation with an upper panel of a back cover; sliding washer means for elastically pressing the sliding surface of the cabinet bottom when the sliding edge of the rear case is slidably engaged with the slide guide groove of the cabinet bottom, the washer means including a screw hole for mounting this means on the boss of the rear case, and a pushing part for elastically pressing the sliding surface in order to support a tilted position of the monitor; and the back cover for covering a rear section of the monitor, the back cover including the upper panel, a side panel and a rear panel.

In accordance with a third embodiment, the present invention provides a monitor tilting device comprising a front case including a cathode ray tube therein; a cabinet bottom, the cabinet bottom including a lower protrusion provided on a front lower surface of the bottom for acting as a point of the center of gravity of the monitor, a stationary support leg provided on a rear lower surface of the bottom for supporting the rear section of the bottom, a front sliding support shoulder, and an opposed pair of sliding side walls, each of the side walls extending upwards from each side of an inner surface of the bottom and having a monitor tilting part provided on its front edge, and a sliding surface extending inwards from an inner surface of the side wall near the front edge, the monitor tilting part including upper and lower shoulders and a plurality of monitor tilting notches between the upper and lower shoulders, the sliding surface being bent backwards at its outer side in order to form a side surface and to define an arc-shaped slide guide groove; a rear case slidably engaged with the cabinet bottom for tilting a monitor, the rear case including an arc-shaped sliding edge slidably engaged with the slide guide groove of the cabinet bottom, a sliding surface extending outwards from the sliding edge, and a boss mounted on the sliding surface; sliding washer means for elastically pressing the sliding surface of the cabinet bottom when the sliding edge of the rear case is slidably engaged with the slide guide groove of the cabinet bottom, the washer means including a screw hole for mounting this means on the boss of the rear case, and a pushing part for elastically pressing the sliding surface, the pushing part being horizontally slit for elasticity and having a protrusion elastically engaged with one of the tilting notches of the cabinet bottom in order to support a tilted position of the monitor; and a back cover for covering a rear section of the monitor, the back cover including an upper panel, a side panel and a rear panel.

In accordance with a fourth embodiment, the present invention provides a monitor tilting device comprising a bracket provided on a lower surface of a monitor, the bracket including: a base formed on the lower surface of the monitor; an opposed pair of rounded first fixtures protruding from opposed sides of the base, each of the first fixtures being provided with a semicircular stepped part on its inner surface; a pair of rounded second fixtures, each of the second fixtures being formed inside a corresponding first fixture with a mounting slit defined therebetween, and having a guide part on a top section of its inner surface; and a center recess defined between the second fixtures; and monitor tilting means rotatably engaged with the bracket, the means including: an opposed pair of rounded first protrusions received into the mounting slits of the bracket, each of the first protrusion having a V-shaped groove on an upper section of its outer surface and a sliding part on a middle section of its inner surface, the V-shaped groove being engaged with the semicircular stepped part of a corresponding first fixture of the bracket, the sliding part having first and second seats and cooperating with a corresponding second fixture of the bracket; a pair of rounded second protrusions, each of the second protrusions being formed inside a corresponding first protrusion with a space therebetween for receiving a corresponding second fixture of the bracket and having an outer projection extending outwards from a middle section of its outer surface, the projection being engaged with the guide part of a corresponding second fixture of the bracket; and a center block provided between the second protrusions, the center block being rounded at its upper top in order to correspond to the center recess of the bracket and including an opposed pair of support legs extending forwards from its front surface, each of the support legs having a linear surface part and an inclined surface part.

In accordance with a fifth embodiment, the present invention provides a monitor tilting device comprising a monitor stand including: a circular sliding depression; an insert member protruding upwards from the circular sliding depression; an opposed pair of rotation limit recesses provided on the sliding depression; and an opposed pair of plates extending outwards from opposed upper sides of the insert member, each of the plates having a first projection and a second projection such that the first projections of the plates are diagonally opposed to each other and the second projections of the plates are diagonally opposed to each other; a sliding washer slidably coupled to the monitor stand and mounted on a bottom surface of a monitor, the sliding washer including: an opposed pair of flanges; a dome-shaped sliding part defined between the flanges; an oval-shaped opening formed on a center portion of the sliding part for receiving the insert member of the monitor stand, the oval-shaped opening being slit at each side thereof for providing a plurality of elastic pieces; and a rotation limit shoulder provided on a lower surface of a first piece of the plurality of elastic pieces; and the bottom surface of the monitor including a plurality of hooks engaged with a locking hole and a locking notch of the flanges of sliding washer, respectively.

BRIEF DESCRIPTION OF THE DRAWINGS

The above objects and other advantages of the present invention will become more apparent by describing the preferred embodiments of the present invention with reference to the attached drawings, in which:

FIG. 5 is a perspective view of the monitor tilting device of FIG. 4 after fabrication;

FIGS. 9A to 9C are views showing in detail the state of the monitor tilting device of FIG. 6, respectively, in which:

FIG. 9A is a side view;

FIG. 9B is a plan view; and

FIG. 9C is a front view;

FIGS. 10A to 10C are views showing in detail the state of the monitor tilting device of FIG. 7, respectively, in which:

FIG. 10A is a side view;

FIG. 10B is a plan view; and

FIG. 10C is a front view;

FIGS. 11A to 11C are views showing in detail the state of the monitor tilting device of FIG. 8, respectively, in which:

FIG. 11A is a side view;

FIG. 11B is a plan view; and

FIG. 11C is a front view;

DETAILED DESCRIPTION OF THE PREFERRED EMBODIMENTS

Figure 1:
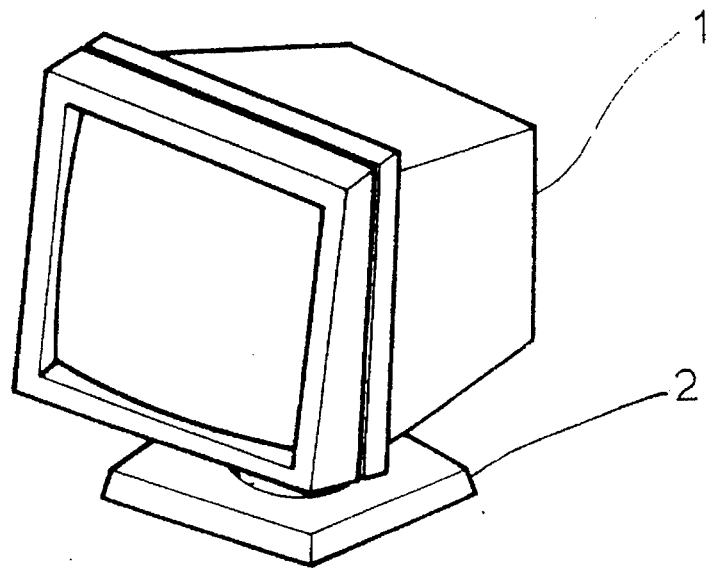
FIG. 1 is a perspective view of a monitor assembly having a conventional monitor tilting structure.
Figure 2:
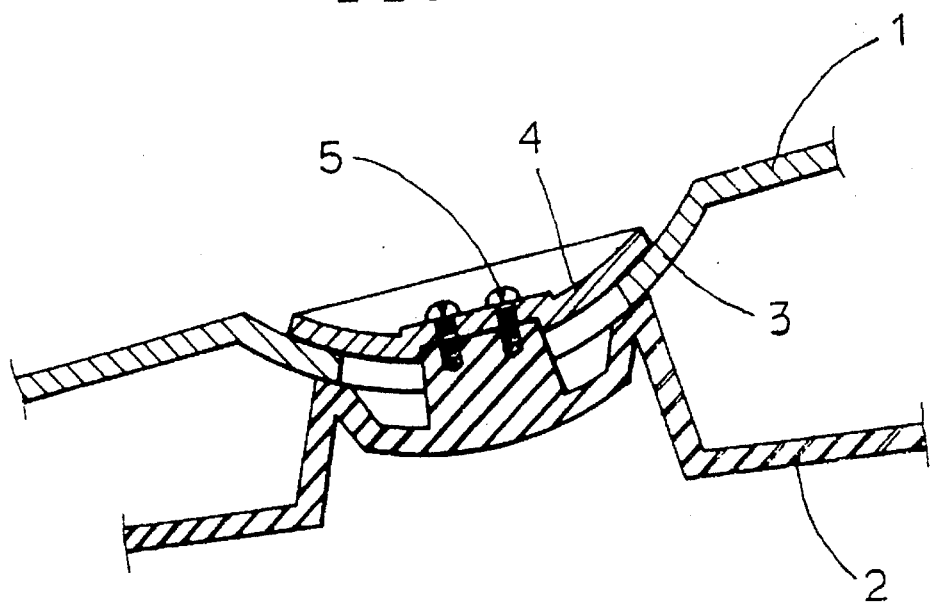
FIG. 2 is a sectional view of the conventional monitor tilting structure provided between a monitor body and a monitor stand of the monitor assembly of FIG. 1.
Figure 3:
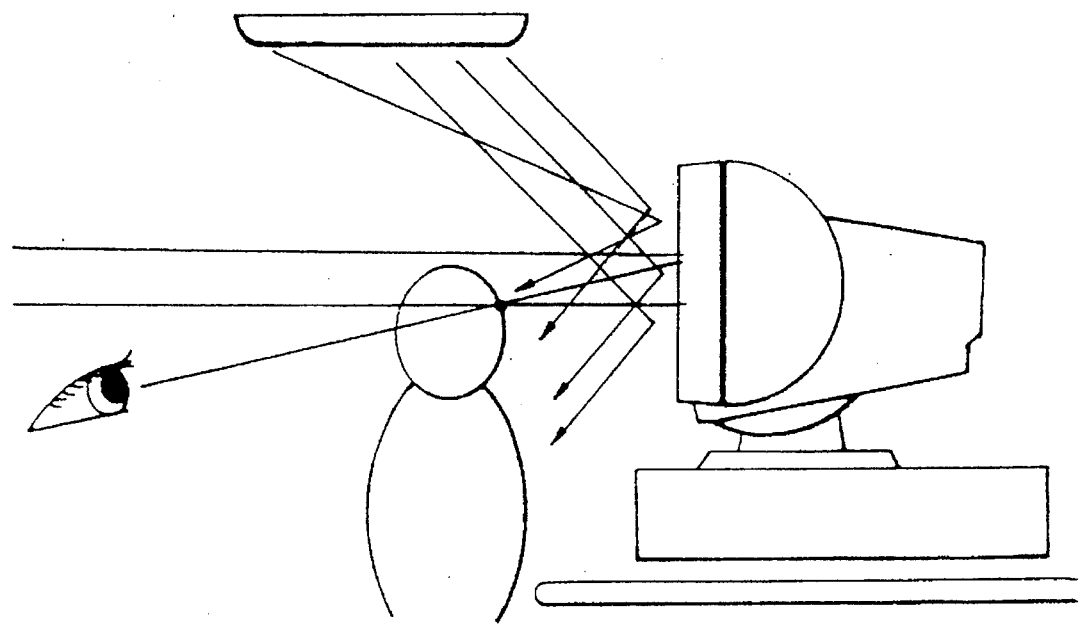
FIG. 3 is a schematic side view showing reflection of light by the monitor screen in the case of use of the monitor assembly of FIG. 1 as being placed on a personal computer.
Figure 4:
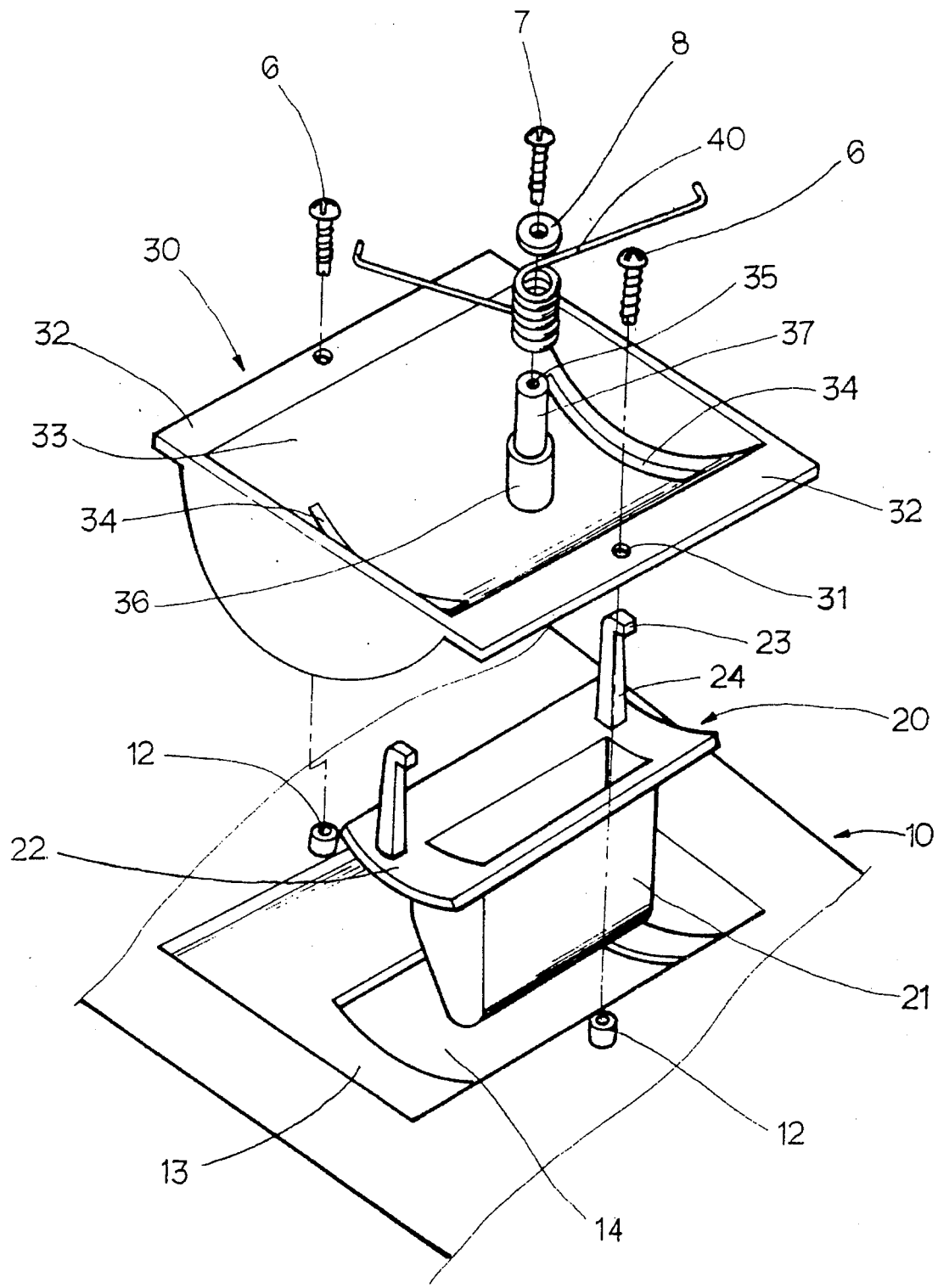
FIG. 4 is an enlarged exploded perspective view of a monitor tilting device in accordance with a primary embodiment of the present invention.
Figure 8:
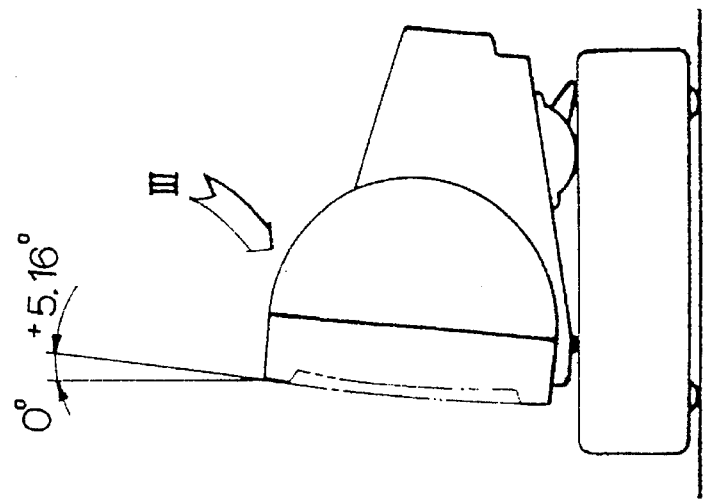
FIGS. 6 to 8 are side views of a monitor, having the monitor tilting device of FIG. 4, placed on a personal computer and tilted at varieties of angles by the monitor tilting device, respectively.
Figure 7:
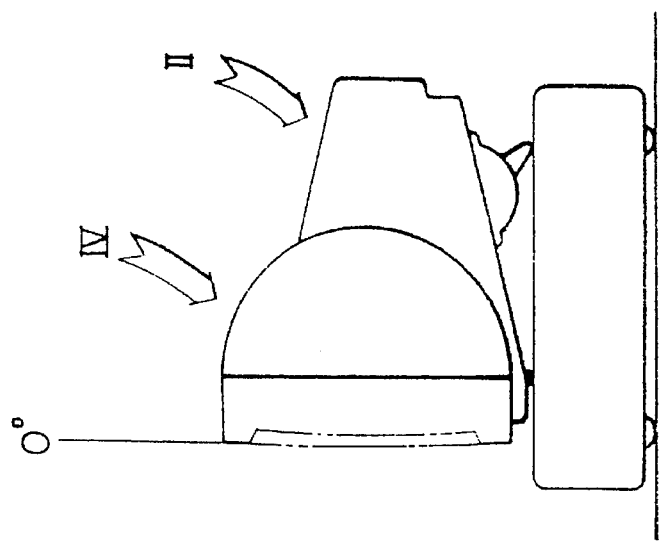
Figure 6:
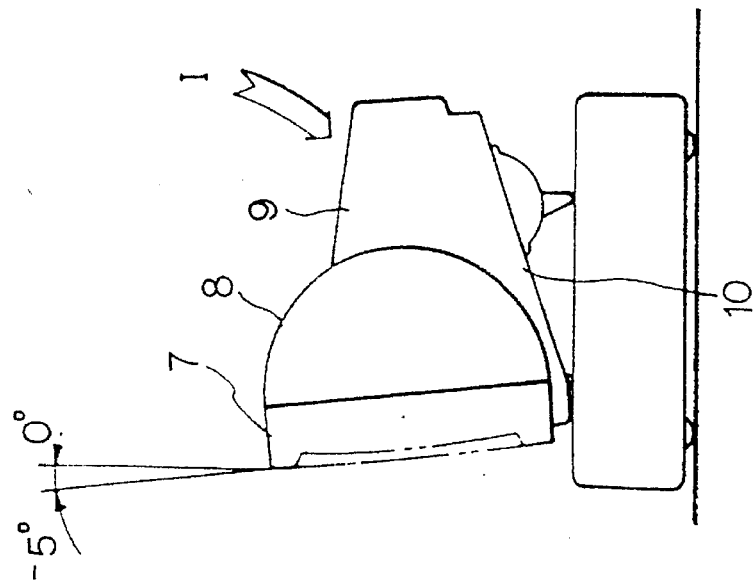

FIG. 4 is an exploded perspective view of a monitor tilting device in accordance with a primary embodiment of the present invention, and FIG. 5 is a perspective view of the monitor tilting device of FIG. 4 after fabrication. FIGS. 6 to 8 are side views of a monitor, having the monitor tilting device of FIG. 4, placed on a personal computer and tilted at varieties of angles by the monitor tilting device, respectively. As shown in these drawings, in particular in FIG. 6, the monitor includes a cathode ray tube (CRT) and comprises a front case 7, a rear case 8, a back cover 9 and a cabinet bottom 10 which are integrated into a monitor housing. This monitor further includes, as shown in particular in FIG. 4, the monitor tilting device of this invention which comprises monitor tilting means 20, sliding washer means 30 and spring means 40 which are mounted on the cabinet bottom 10.

At the front section of the lower surface of the cabinet bottom 10 is provided with a lower protrusion 11 (FIG. 9A) which acts as a point of the center of gravity of the monitor or a point of action during the monitor tilting operation. The monitor tilting device is mounted on the rear section of the lower surface of the cabinet bottom 10. As best seen in FIG. 4, this lower surface of the cabinet bottom 10 is provided with a pair of fixing bosses 12, a sliding part 13 formed between the bosses 12, and a tilting opening 14 defined on the center of the sliding part 13 at the rear section on which the monitor tilting device is mounted.

The tilting means 20 includes a tilting lever 21 and an arc-shaped sliding surface 22 integrally formed with the top of the tilting lever 21. The tilting means 20 further includes a pair of turning guiders 24 which are erected on opposed sides of the sliding surface 22 and each has a hook 23 on its top. The tilting lever 21 is downwardly inserted into the tilting opening 14 of the cabinet bottom 10 such that it protrudes from the lower surface of the bottom 10.

The sliding washer means 30 comprises a rectangular flange surface 32 having an opposed pair of fixing holes 31 corresponding to the fixing bosses 12 of the cabinet bottom 10. An arc-shaped sliding part 33 corresponding to the arc-shaped sliding surface 22 of the monitor tilting means 20 is integrally surrounded by the flange surface 32. This sliding part 33 is provided on its opposed sides with a pair of guide slits 34 for receiving the pair of turning guiders 24 and guiding the turning movement of these turning guiders 24 about the sliding part 33, respectively. A protrusion 36, having a fixing boss 35 on its top, vertically extends from the center upper surface of the sliding part 33. In order to mount this monitor tilting device to the cabinet bottom 10, the tilting lever 21 is downwardly inserted into the tilting opening 14 of the cabinet bottom 10 and, thereafter, the sliding washer means 30 is laid on the sliding surface 22 such that the guide slits 34 receive the turning guiders 24. A screw 6 tightly screws into each fixing boss 12 of the cabinet bottom 10 through a corresponding fixing hole 31 of the flange surface 32, thus to mount the monitor tilting means 20 as well as the sliding washer means 30 to the cabinet bottom 10.

In the primary embodiment of the present invention, it is preferred to select a coiled torsion spring as the spring means 40 as shown in FIGS. 4 and 5. In this case, the coiled torsion spring 40 is mounted about a spring receiving part 37 formed on the upper section of the protrusion 36 of the sliding washer means 30 and its arms are caught by the hooks 23 of individual turning guiders 24 of the tilting means 20. Thereafter, a screw 7 screws into the inner threaded hole of the fixing boss 35 of the protrusion 36 with interposition of a washer 8, thus to elastically support the monitor tilting means 20.

FIG. 6 shows the monitor leaned forwards at 5° tilting angle, FIG. 7 shows the monitor straightly erected to face the front at 0° tilting angle and FIG. 8 shows the monitor leaned backwards at 5.16° tilting angle. As shown in FIGS. 6 to 8, the monitor according to the present invention can be freely adjusted within the limits of from −5° to 5.16°.

Figure 10:
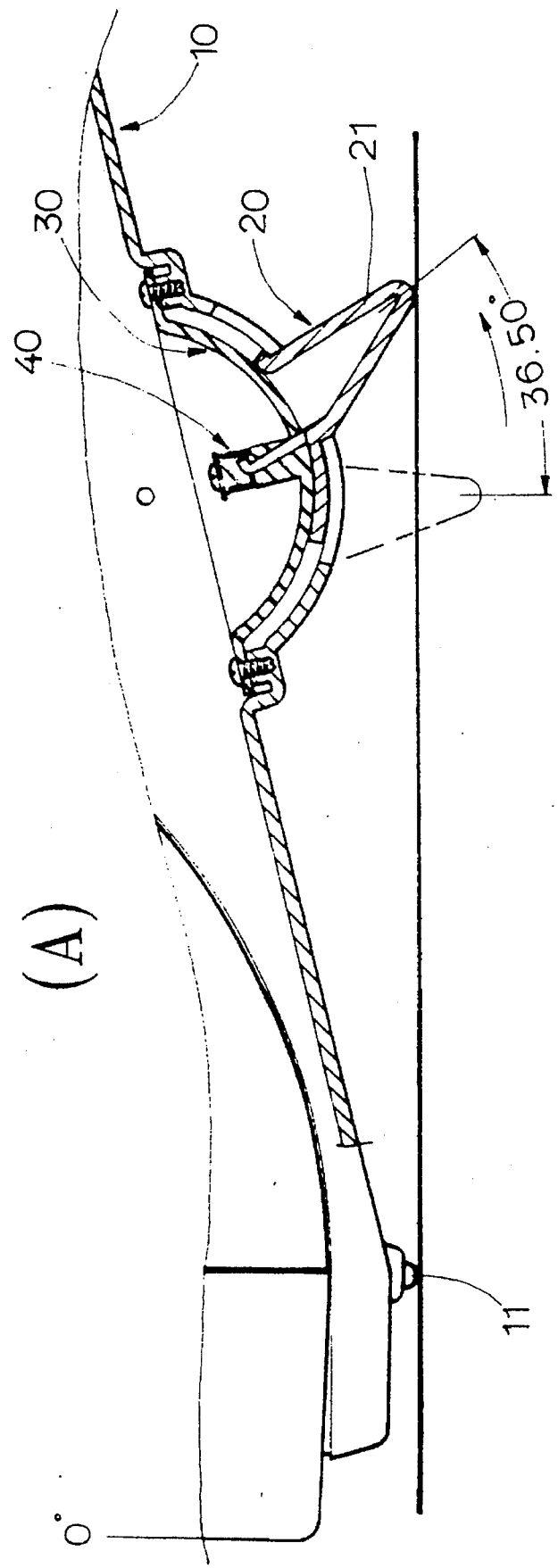
Figure 11:
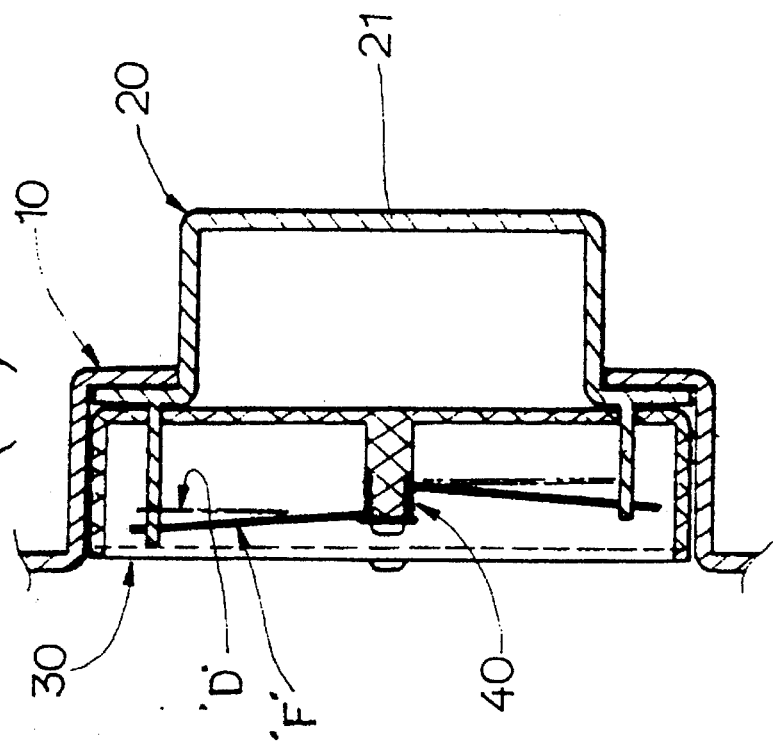
Figure 11:
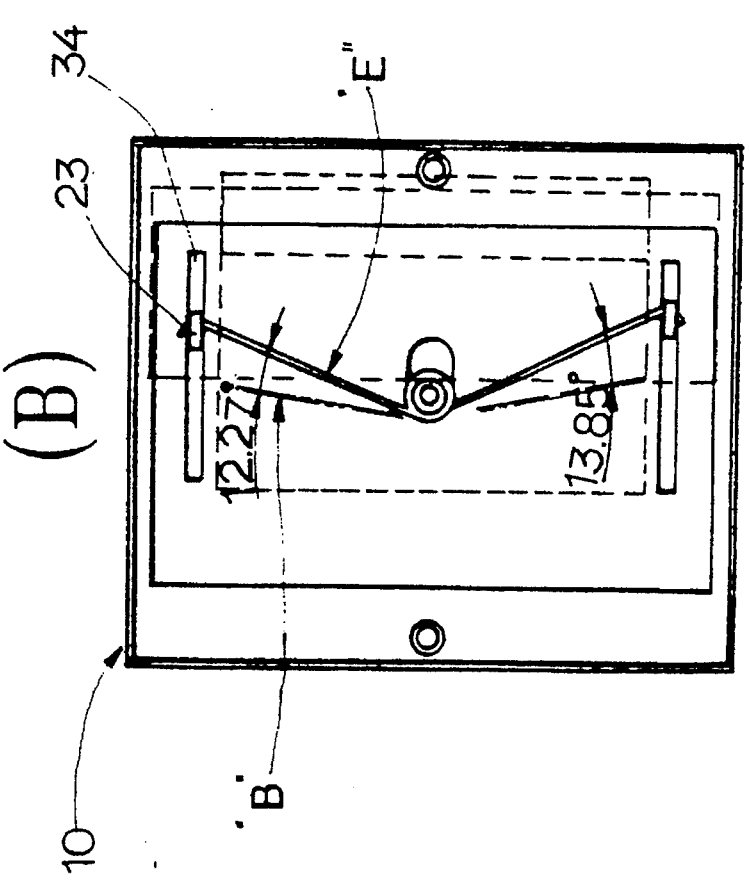

The monitor tilting operation of the device of this embodiment will be described in detail in conjunction with FIGS. 9 to 11.

FIGS. 9A to 9C are views showing the state of the monitor tilting device of FIG. 6, respectively. At the "A" position of FIG. 9B, the coiled torsion spring 40 is caught at its arms by the hooks 23 of the turning guiders 24 of the monitor tilting means 20 and elastically supports the tilting lever 21 such that this tilting lever 21 is erected. At this state, the monitor is extremely leaned forwards at 5° tilting angle.

In order to lean backwards the monitor in the state of FIG. 6, the monitor is pushed down as shown at the arrow I of FIG. 6, so that the tilting lever 21 of the tilting means 20 is elastically turned counterclockwise, preferably at an angle of 36.5°. At the same time of turning of the tilting lever 21, the coiled torsion spring 40 is changed in the position of its arms from the "A" position (shown in FIG. 9B and shown at the dotted line of FIG. 10B) to the "B" position (shown at the solid line of FIG. 10B). Also, the arms of the coiled torsion spring 40 are lowered from the "C" position (shown at the dotted line of FIG. 10C) to the "D" position (shown at the solid line of FIG. 10C). Thus, the position of the monitor of FIG. 7 is achieved. In this case, the upper end of the coiled torsion spring 40 is preferably rotated at an angle of 16.79° while the lower end of the coiled torsion spring 40 is rotated at an angle of 20.86°. The coiled spring 40 in the state of FIGS. 10B and 10C is increased in its elasticity than in the state of FIGS. 9B and 9C.

When the monitor in the state of FIG. 7 is more pushed down as shown at the arrow II of FIG. 7, the tilting lever 21 of the tilting means 20 is turned counterclockwise, preferably at an angle of 22.5°. At the same time of turning of the tilting lever 21, the coiled torsion spring 40 is changed in the position of its arms from the "B" position (shown at the solid line of FIG. 10B and shown at the dotted line of FIG. 11B) to the "E" position (shown at the solid line of FIG. 11B).

Also, the arms of the coiled torsion spring 40 ascend from the "D" position (shown at the solid line of FIG. 10C and shown at the dotted line of FIG. 11C) to the "F" position (shown at the solid line of FIG. 11C). Thus, the position of the monitor of FIG. 8 is achieved. In this case, it is preferred that the upper end of the coiled torsion spring 40 is rotated at an angle of 12.27° while the lower end of the coiled torsion spring 40 is rotated at an angle of 13.85°. The coiled spring 40 in the state of FIGS. 11B and 11C is increased in its elasticity than in the state of FIGS. 10B and 10C.

In order to lean forwards the monitor in the state of FIG. 8, the monitor is pushed as shown at the arrow III of FIG. 8, so that the coiled torsion spring 40 returns from the position of FIGS. 11B and 11C to the position of FIGS. 10B and 10C thanking for its restoring force, thus to cause the tilting lever 21 to achieve the position of FIG. 7. When the monitor in the state of FIG. 7 is more pushed as shown at the arrow III of FIG. 8, the monitor achieves the position of FIG. 6.

Figure 12:
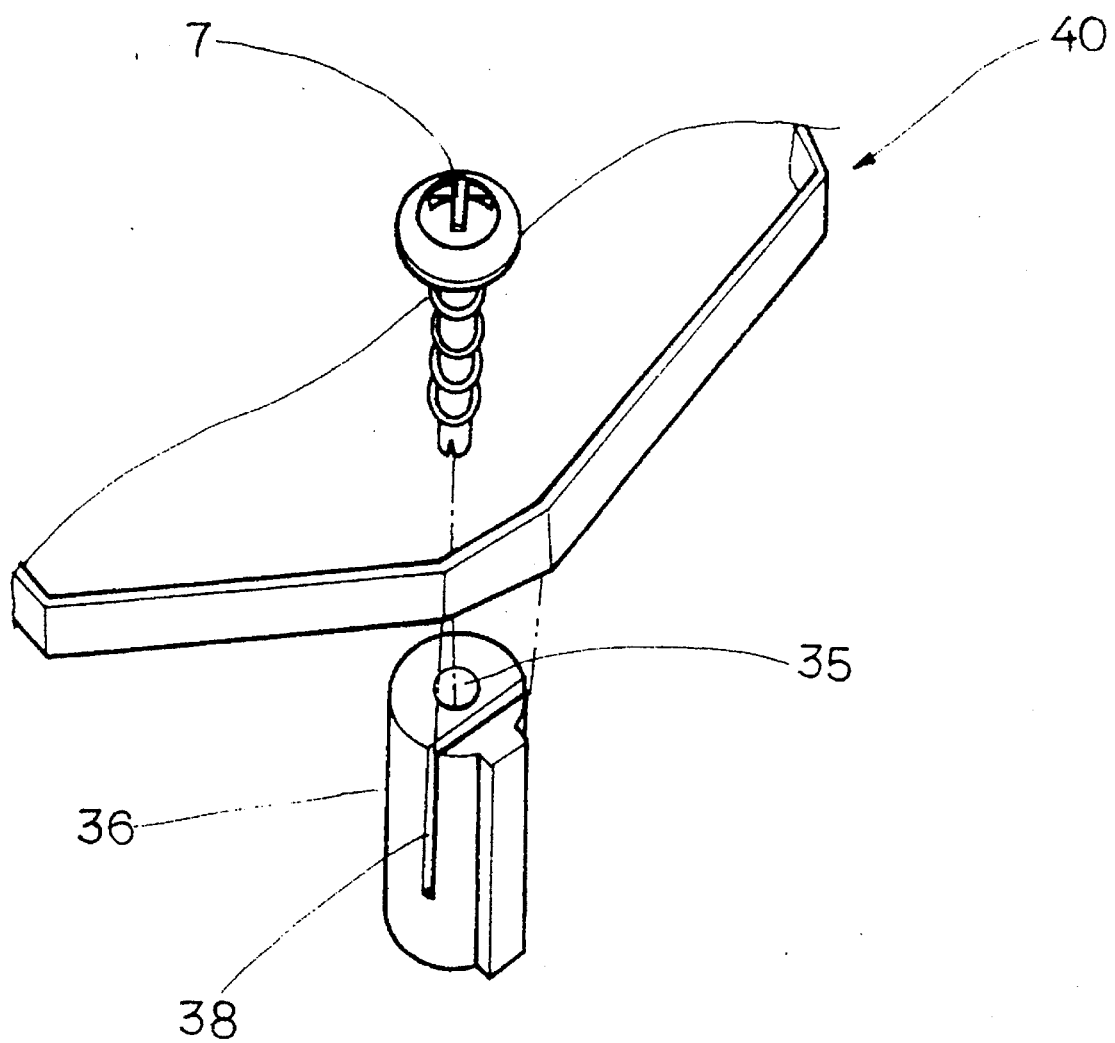
FIG. 12 is an enlarged exploded perspective view of another embodiment of spring means used in the monitor tilting device of the primary embodiment of the present invention.

Turning to FIG. 12, there is shown a spring means 40 in accordance with another embodiment of the present invention. In this embodiment, the spring means 40 uses a plate torsion spring instead of the aforementioned coiled torsion spring. In order to mount the plate spring 40 of this embodiment on the protrusion 36 of the sliding washer means 30, the protrusion 36 is provided with a spring receiving slit 38 which receives the plate spring 40. The plate spring 40 of this embodiment yields the same result as that described for the primary embodiment without affecting the functioning of this invention.

Figure 13:
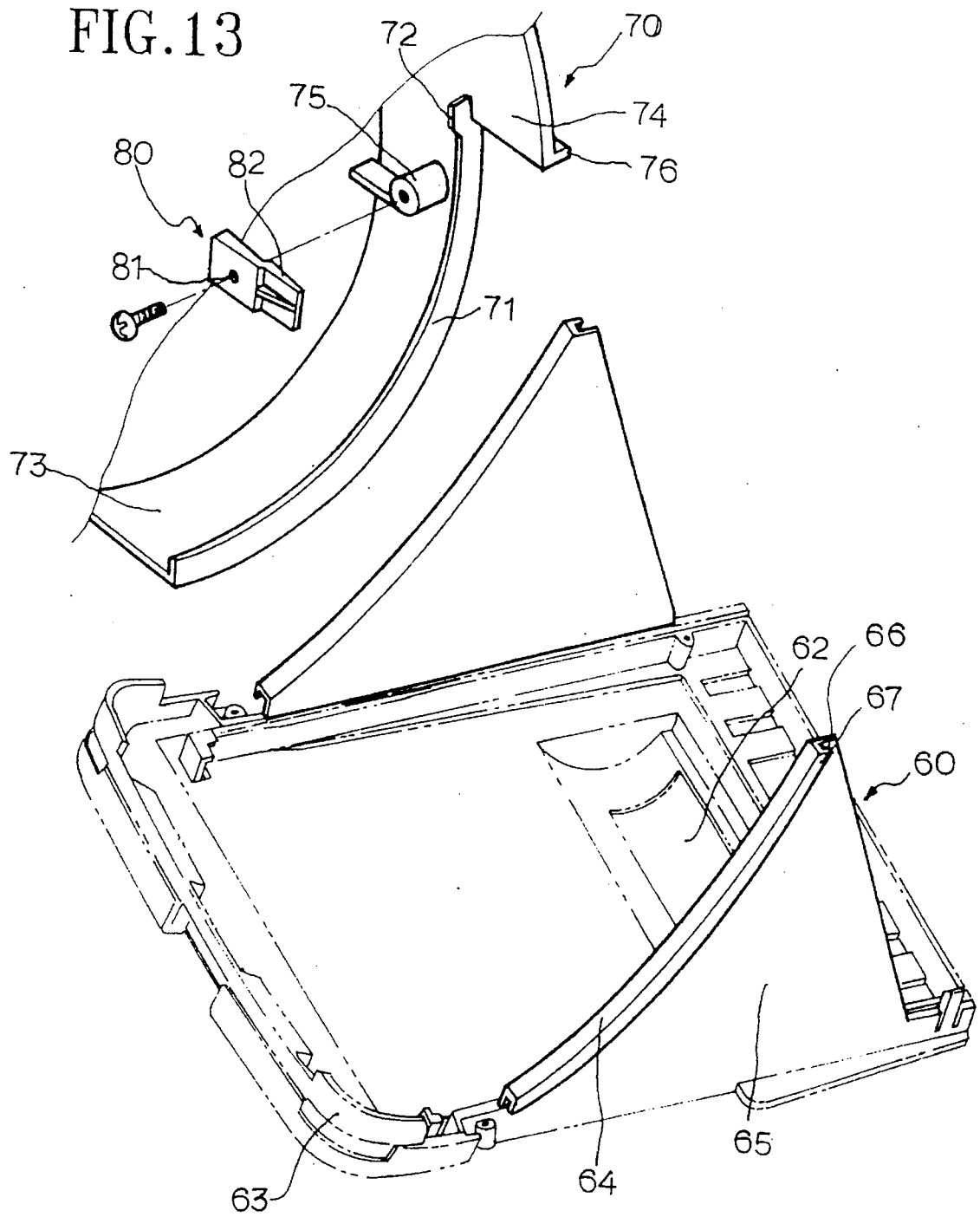
FIG. 13 is an exploded perspective view of a monitor tilting device in accordance with a second embodiment of the present invention.
Figure 14:
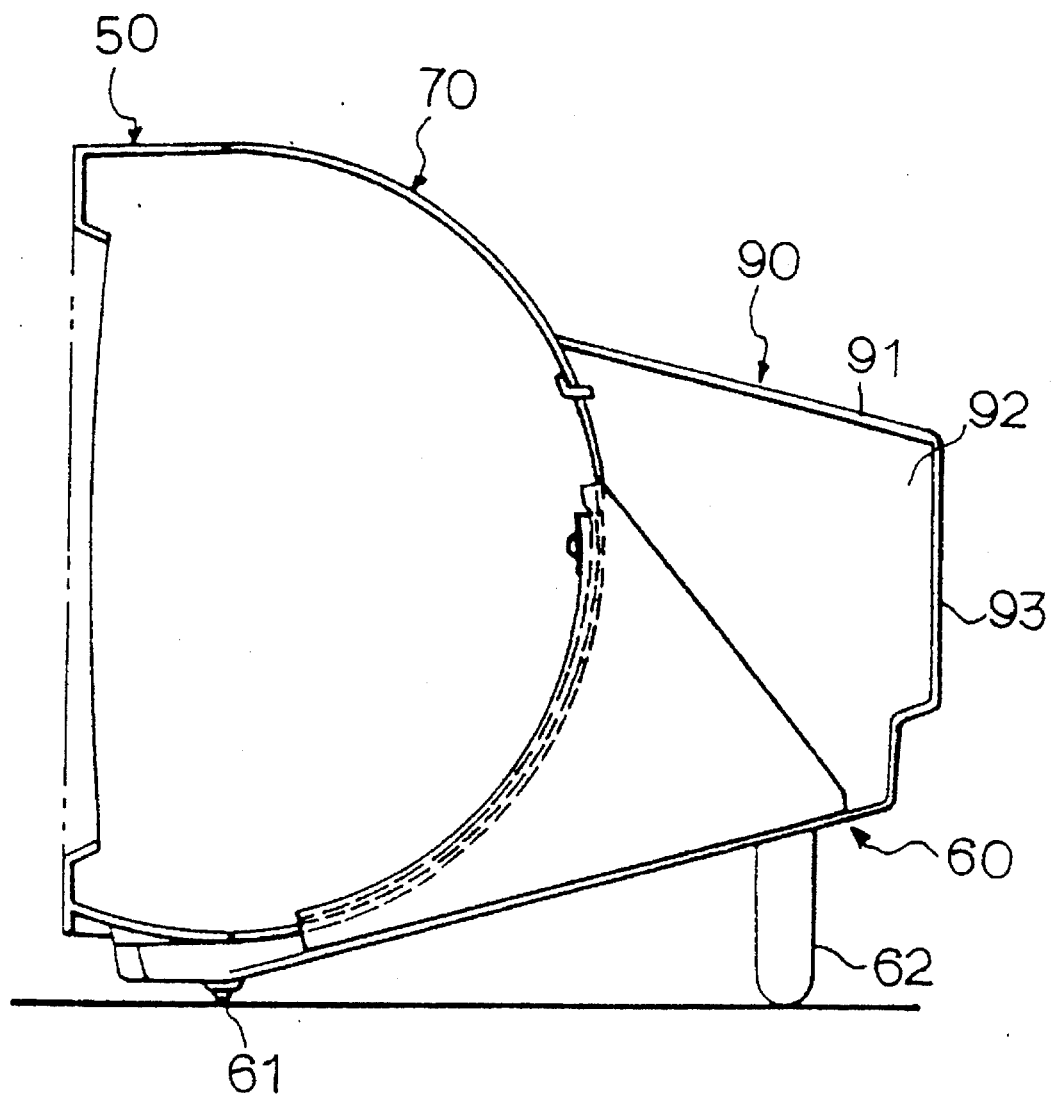
FIG. 14 is a side view of a monitor having the monitor tilting device of FIG. 13 after fabrication.
Figure 15:
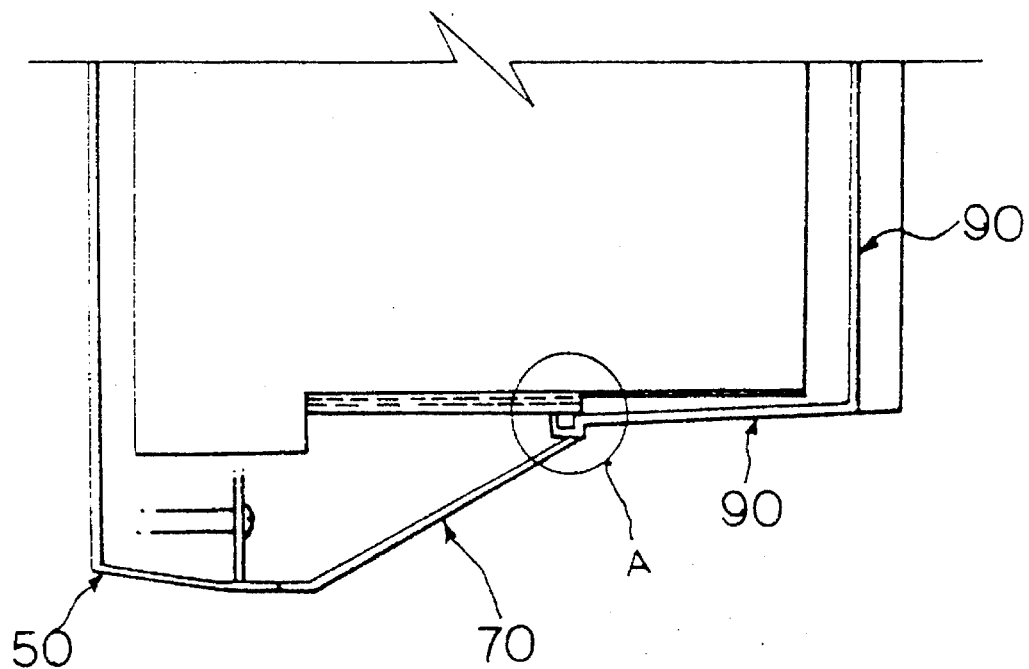
FIG. 15 is a partially plan view of the monitor tilting device of FIG. 14.
Figure 16:
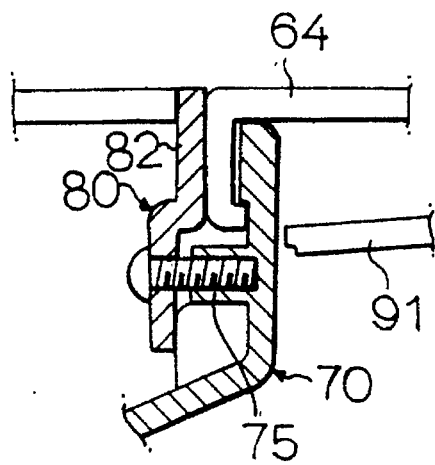
FIG. 16 is an enlarged sectional view of the A portion of FIG. 15.

FIG. 13 is an exploded perspective view of a monitor tilting device in accordance with a second embodiment of the present invention, and FIG. 14 is a side view of a monitor having the monitor tilting device of FIG. 13. As shown in these drawings, the monitor includes the cathode ray tube (CRT) therein and comprises a front case 50, a cabinet bottom 60, a rear case 70, spring washer means 80 and a back cover 90 which are fabricated as shown in FIGS. 15 and 16.

At the front section of the lower surface of the cabinet bottom 60 is provided with a lower protrusion 11 (FIG. 14) which acts as a point of the center of gravity of the monitor or a point of action during the monitor tilting operation. A stationary support leg 62 is mounted on the rear section of the lower surface of the cabinet bottom 60. The cabinet bottom 60 further includes a front sliding support shoulder 63 and an opposed pair of curved sliding side walls 65. Each of the side walls 65 extends upwards from each side of the cabinet bottom 60 and has an arc-shaped sliding surface 64 at its front surface. This sliding surface 64 is bent backwards at its outer side in order to form an arc-shaped side surface 67, thus to define a slide guide groove 66.

The rear case 70 includes an arc-shaped sliding edge 71 which is slidably engaged with the slide guide groove 66 of the cabinet bottom 60. A lower shoulder 72 extends forwards from the upper end of the sliding edge 71. A first sliding surface 73 extends outwards from the sliding edge 71 such that this first sliding surface 73 shows an arc shape corresponding to the arc-shaped sliding edge 71. The first sliding surface 73 is provided with a boss 75 at a position under the lower shoulder 72. In addition, a second sliding surface 74 extends inwards from the lower shoulder 72 and has an upper shoulder 76 which extends backwards from the lower end of the second sliding surface 74.

The sliding washer means 80 includes a screw hole 81 and a pushing part 82. The screw hole 81 corresponds to the inner threaded hole of the boss 75 of the first sliding surface 73 while the pushing part 82 elastically presses the arc-shaped sliding surface 64 of the cabinet bottom 60 when the arc-shaped sliding edge 71 is slidably engaged with the slide guide groove 66 of the cabinet bottom 60.

The back cover 90 comprises an upper panel 91, a side panel 92 and a rear panel 93, and covers the rear section of the monitor as best seen in FIG. 14.

Figure 17:
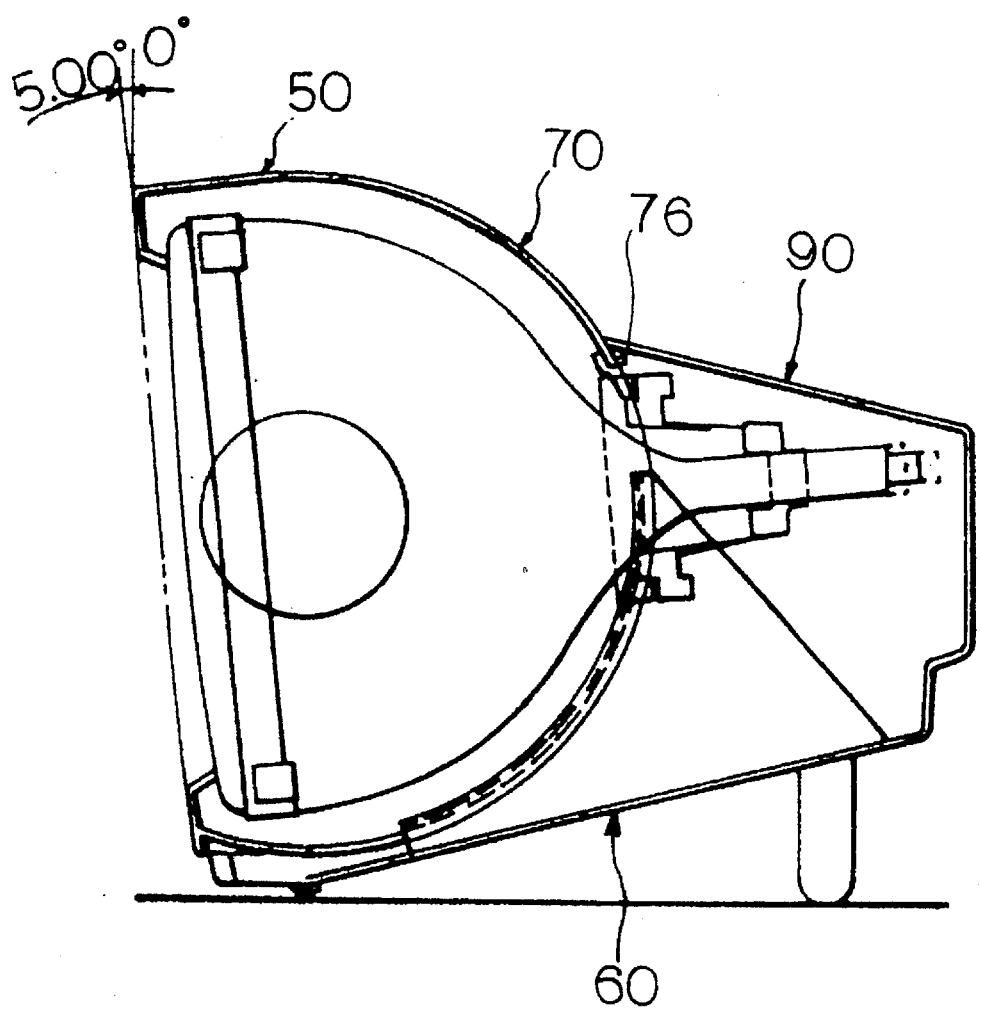
FIGS. 17 to 19 are side views of a monitor, having the monitor tilting device of FIG. 13, tilted at varieties of angles by the monitor tilting device, respectively.
Figure 18:
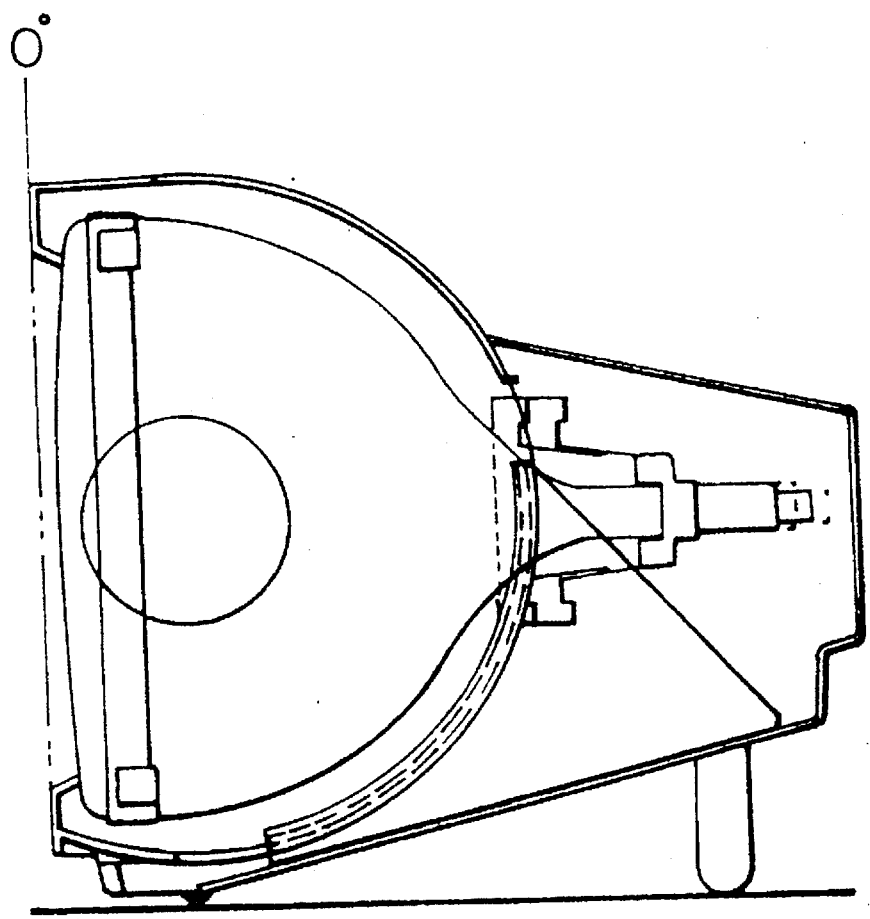
Figure 19:
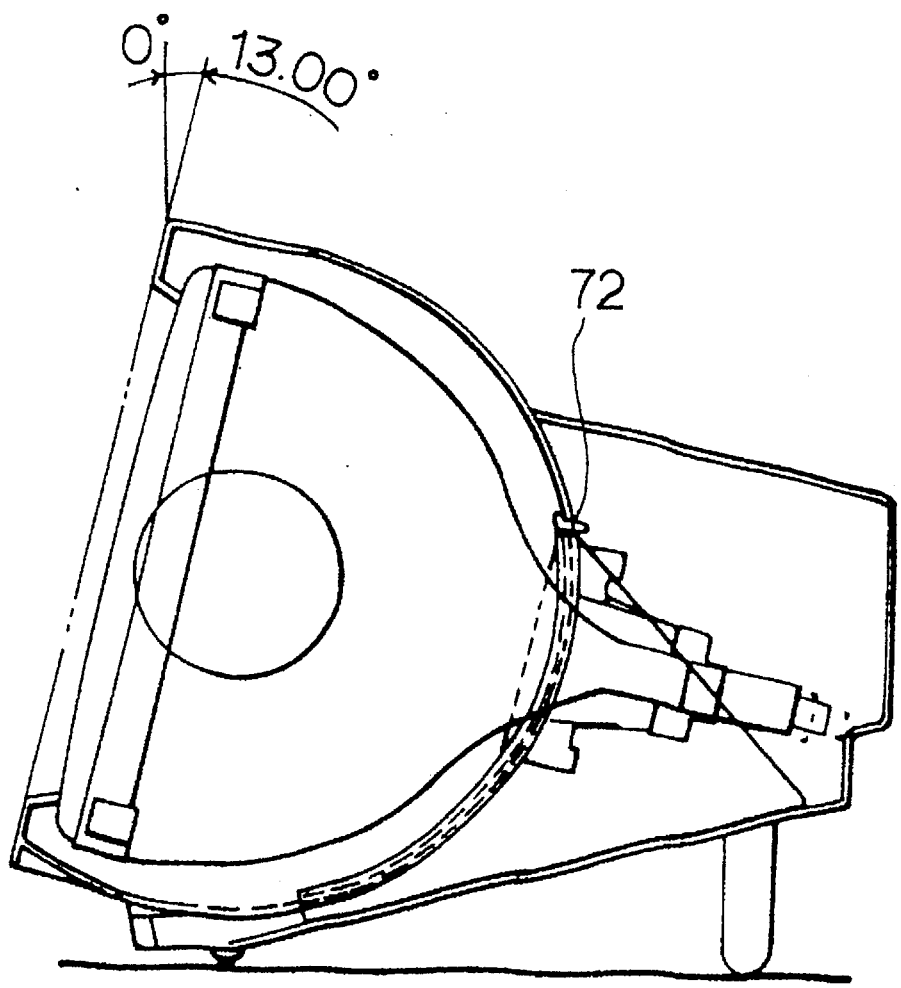

FIGS. 17 to 19 are side views of a monitor, having the monitor tilting device of FIG. 13, tilted at varieties of angles by the monitor tilting device, respectively. FIG. 17 shows the monitor leaned forwards at 5° tilting angle and, at this state, the upper shoulders 76 of the rear case 70 are caught by the lower surface of the upper panel 91 of the back cover 90. When the monitor in the state of FIG. 17 is pushed backwards at its front upper section, it is straightly erected to face the front as shown in FIG. 18 (tilting angle =0°). When the monitor in the state of FIG. 18 is more pushed backwards at its front upper section, it is leaned backwards at an angle of 13.00° as shown in FIG. 19. At this state, the lower shoulders 72 of the rear case 70 are caught by the top ends of the sliding side walls 65 of the cabinet bottom 60, respectively. On the contrary, in order to lean the monitor in the state of FIG. 18 or 19 forwards, the monitor is pushed backwards at its front lower section.

As described above, the monitor tilting devices in accordance with the primary embodiment and the second embodiment of the present invention allow the desired monitor tilting operation to be achieved by simply pushing the upper or lower section of the monitor using one hand.

Figure 20:
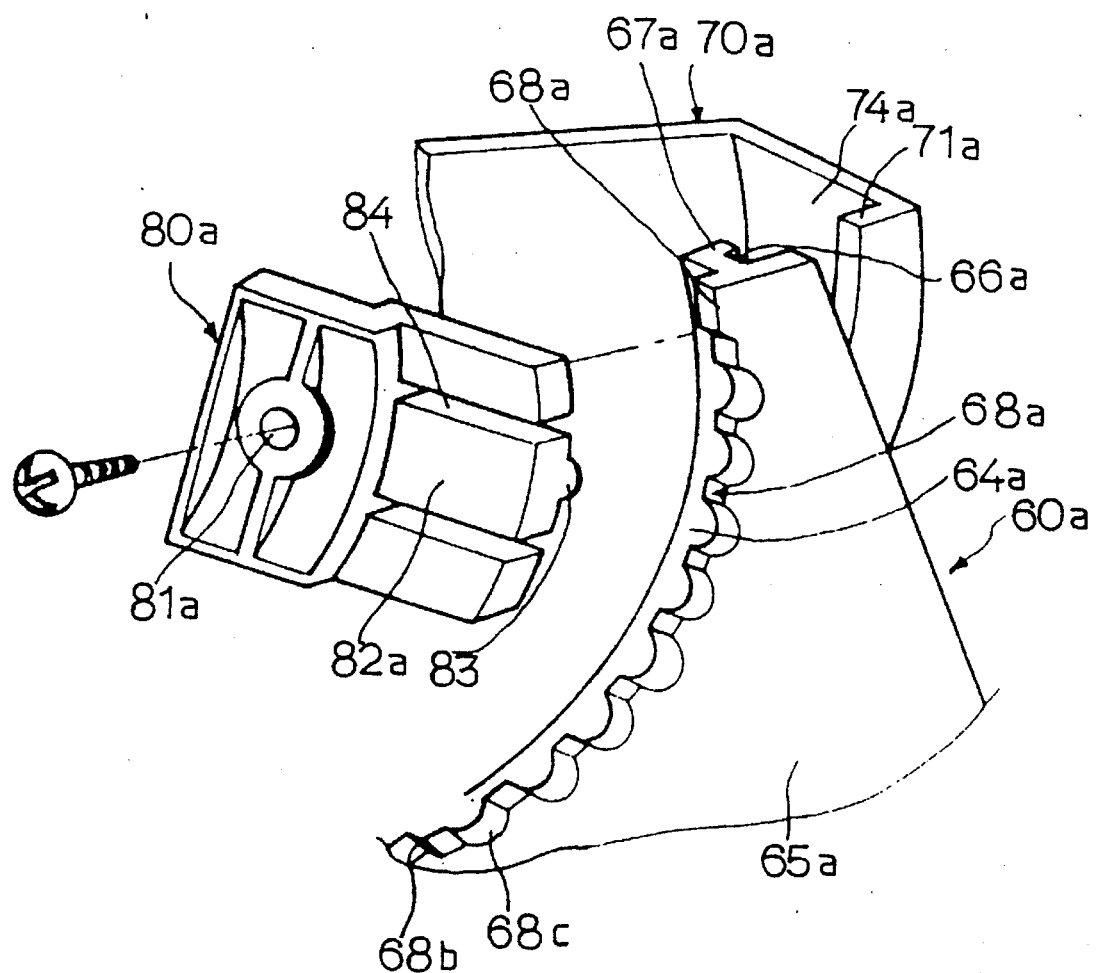
FIG. 20 is an exploded perspective view of a monitor tilting device in accordance with a third embodiment of the present invention.

Turning to FIG. 20, there is shown in an enlarged exploded perspective view a monitor tilting device in accordance with a third embodiment of the present invention. Those elements similar to both the second embodiment of FIG. 13 and the third embodiment of FIG. 20 will carry reference numerals which differ by alphabet scripts.

The monitor tilting device according to this third embodiment includes a sliding side wall 65a of a cabinet bottom 60a, a rear case 70a and sliding washer means 80a substituting for the sliding side wall 65 of the cabinet bottom 60, the rear case 70 and the sliding washer means 80 of the second embodiment, respectively. Each of the sliding side walls 65a of the cabinet bottom 60a includes a monitor tilting part 68 which in turn includes upper and lower shoulders 68a and 68b provided on the upper and lower ends of the curved front edge of the side wall 65a, respectively. A plurality of monitor tilting notches 68c are formed on the curved front edge of the side wall 65a between the shoulders 68a and 68b such that they are spaced out at regular intervals with teeth therebetween. The sliding side wall 65a also includes a sliding surface 64a which extends inwards from the inner surface of the side wall 65a near the front edge. This sliding surface 64a is bent backwards at its outer side in order to form an arc-shaped side surface 67a, thus to define a slide guide groove 66a.

The rear case 70a includes an arc-shaped sliding edge 71a which is slidably engaged with the slide guide groove 66a of the cabinet bottom 60a. A sliding surface 74a extends outwards from the sliding edge 71a such that this sliding surface 74a shows an arc shape corresponding to the arc-shaped sliding edge 71a. The sliding surface 74a is provided with a boss 75a.

The sliding washer means 80a includes a screw hole 81a and a pushing part 82a. This pushing part 82a comprises three extensions which are horizontally separated from each other by slits 84. The center extension has a protrusion 83 on its rear surface. The screw hole 81a corresponds to the inner threaded hole of the boss 75a of the sliding surface 74a while the pushing part 82a elastically presses the tilting part 68 of the cabinet bottom 60a when the arc-shaped sliding edge 71a is slidably engaged with the slide guide groove 66a of the cabinet bottom 60a. When the arc-shaped sliding edge 71a is slidably engaged with the slide guide groove 66a of the cabinet bottom 60a, the protrusion 83 of the center extension of the pushing part 82a is received into one of the plurality of tilting notches 68c of the tilting part 68. Here, the slits 84 provide a desired elasticity for the extensions of the pushing part 82a, thus to cause a deflection of the extensions of the pushing part 82a when the protrusion 83 of the center extension move along the monitor tilting part 68 having the notches 68c.

Figure 21:
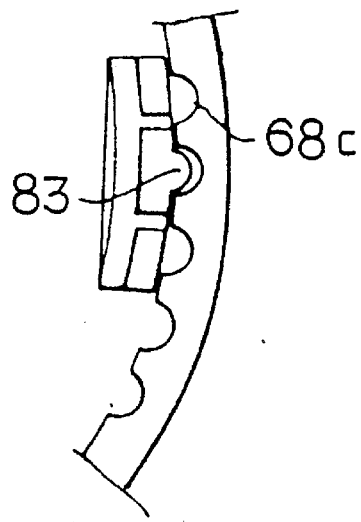
FIG. 21 is an partially side view showing sliding washer means of the monitor tilting device of FIG. 20 of which a protrusion is engaged with one of a plurality of monitor tilting notches of a cabinet bottom.
Figure 23:
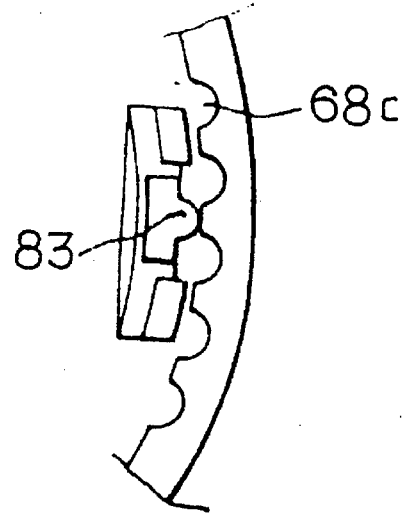
FIG. 23 is an partially side view showing the sliding washer means of FIG. 21 of which the protrusion 83 is elastically placed on a tooth between the monitor tilting notches in the monitor tilting operation.
Figure 22:
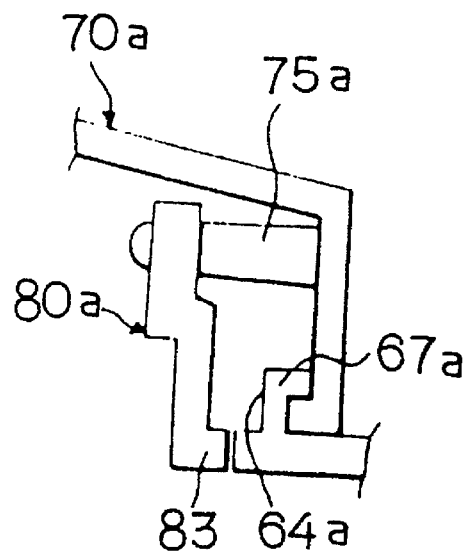
FIG. 22 is an enlarged plan view of FIG. 21.
Figure 24:
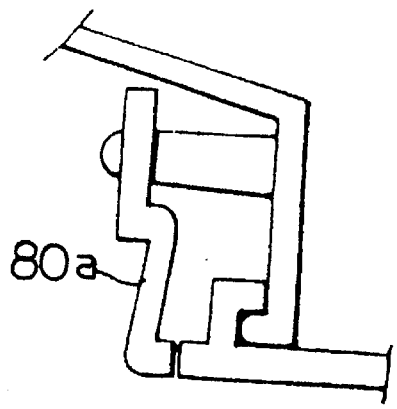
FIG. 24 is an enlarged plan view of FIG. 23.

When the monitor, of which the protrusion 83 is engaged with one of the monitor tilting notches 68c as shown in FIGS. 21 and 22, is pushed backwards at its upper front section in order to lean the monitor backwards, the pushing part 82a moves downwards along the monitor tilting part 68 and the protrusion 83 of the center extension is decoupled from the notch 68c and elastically placed on a tooth between the notches 68c as shown in FIGS. 23 and 24. In this case, the side extensions of the pushing part 82a are straightened in order to return to their original state as best seen in the side view of FIG. 23. When the monitor in the state of FIGS. 23 and 24 is more pushed backwards, the protrusion 83 is received into and engaged with a lower notch 68c, thus to lean the monitor backwards at a desired tilting angle. On the contrary, when the monitor is pushed backwards at its lower front section, the protrusion 83 of the pushing part 82a moves upwards with respect to the monitor tilting part 68 in order to be engaged with an upper notch 68c, thus to lean the monitor forwards.

Figure 25:
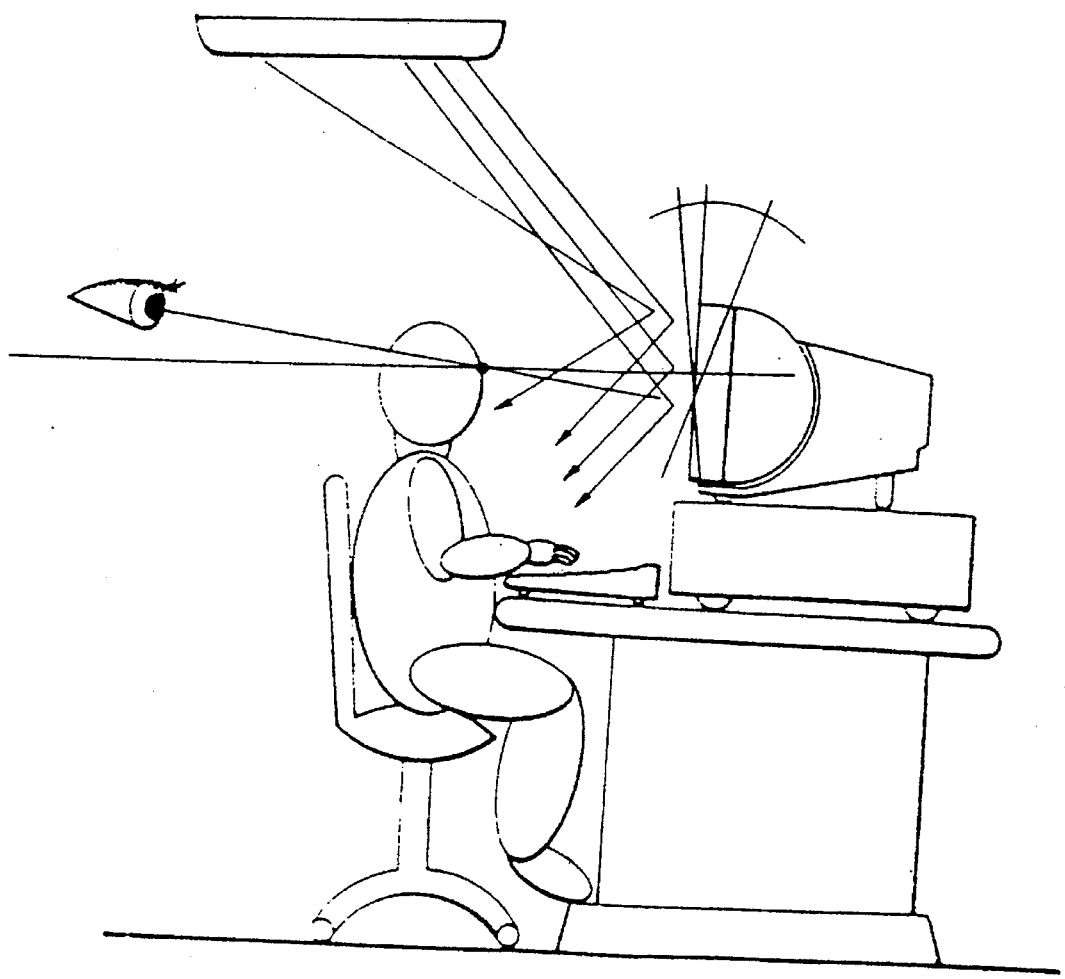
FIG. 25 is a schematic side view showing reflection of light by the monitor screen in the case of use of the monitor tilting device according to the second and third embodiments of the present invention.

As described above, the monitor tilting device of the present invention does not require an additional monitor stand, achieves a desired monitor tilting operation using one hand, and prevents, as shown in FIG. 25, reflection of light by the monitor screen causing a fatigue of the user's eye.

Figure 26:
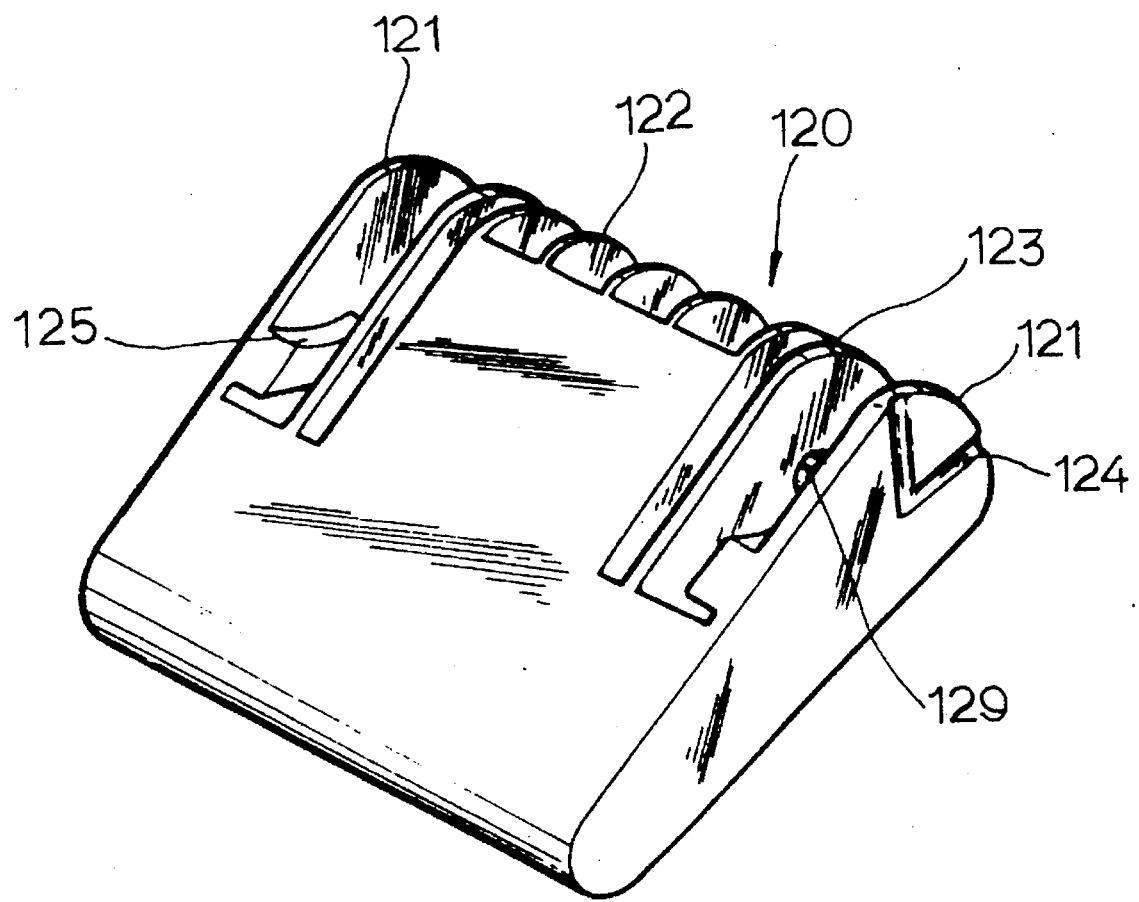
FIG. 26 is a perspective view of a monitor tilting means of monitor tilting device in accordance with a fourth embodiment of the present invention.
Figure 27:
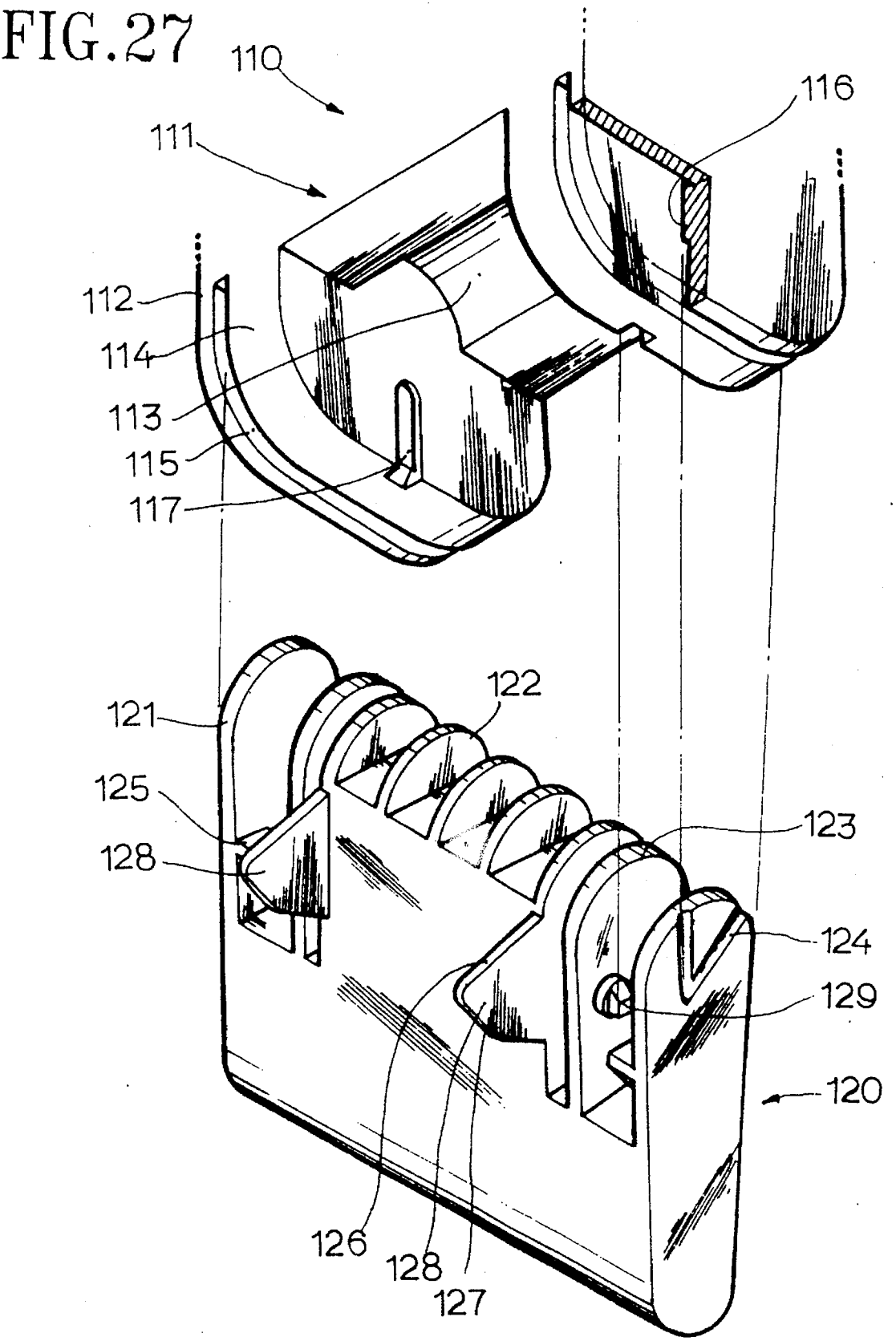
FIG. 27 is an enlarged exploded perspective view of the monitor tilting device according to the fourth embodiment of this invention comprising a bracket of a monitor and the monitor tilting means of FIG. 26.

Turning to FIGS. 26 and 27, there is shown a monitor tilting device in accordance with a fourth embodiment of the present invention. In this fourth embodiment, the monitor tilting device comprises a bracket 110 provided on a lower surface of the monitor, and monitor tilting means 120 inserted into and engaged with the bracket 110 such that it is rotatable about the bracket 110.

The bracket 110 includes a base 111 formed on the lower surface of the monitor, an opposed pair of rounded edges or first fixtures 112 having smaller thickness, and a pair of rounded second fixtures 114 having larger thickness. Each of the second fixtures 114 is formed inside a corresponding first fixture 112 with a mounting slit 115 defined therebetween. A center recess 113 is defined between the second fixtures 114.

Each of the first fixtures 112 is provided with a semicircular stepped part 116 on its inner surface while each of the second fixtures 114 is provided with a guide part 117 on the top section of its inner surface.

The monitor tilting means 120 includes an opposed pair of rounded edges or first elastic protrusions 121 which are to be received into the mounting slits 115, and a pair of rounded second elastic protrusions 123. Each of the second protrusions 123 is formed inside a corresponding first protrusion 121 with a space therebetween for receiving a corresponding second fixture 114 of the bracket 110. A center block 122, having a plurality of upper protrusions spaced out at regular intervals, is provided between the second protrusions 123.

Each of the first protrusion 121 is provided with a V-shaped groove 124 on the upper section of its outer surface, and with a sliding part 125 on the middle section of its inner surface. The sliding part 125 includes first and second seats 125a and 125b. In this embodiment, it is preferred to round the corner of the V-shaped groove 124 in order for easily achieving the monitor tilting operation.

The center block 122 is rounded at its upper top in order to correspond to the center recess 113 of the bracket 110 and includes an opposed pair of support legs 128 each of which has a linear surface part 126 as well as an inclined surface part 127.

Each of the second protrusions 123 is provided with an outer projection 129 which extends from the middle section of the outer surface of the second protrusion 123.

Figure 28:
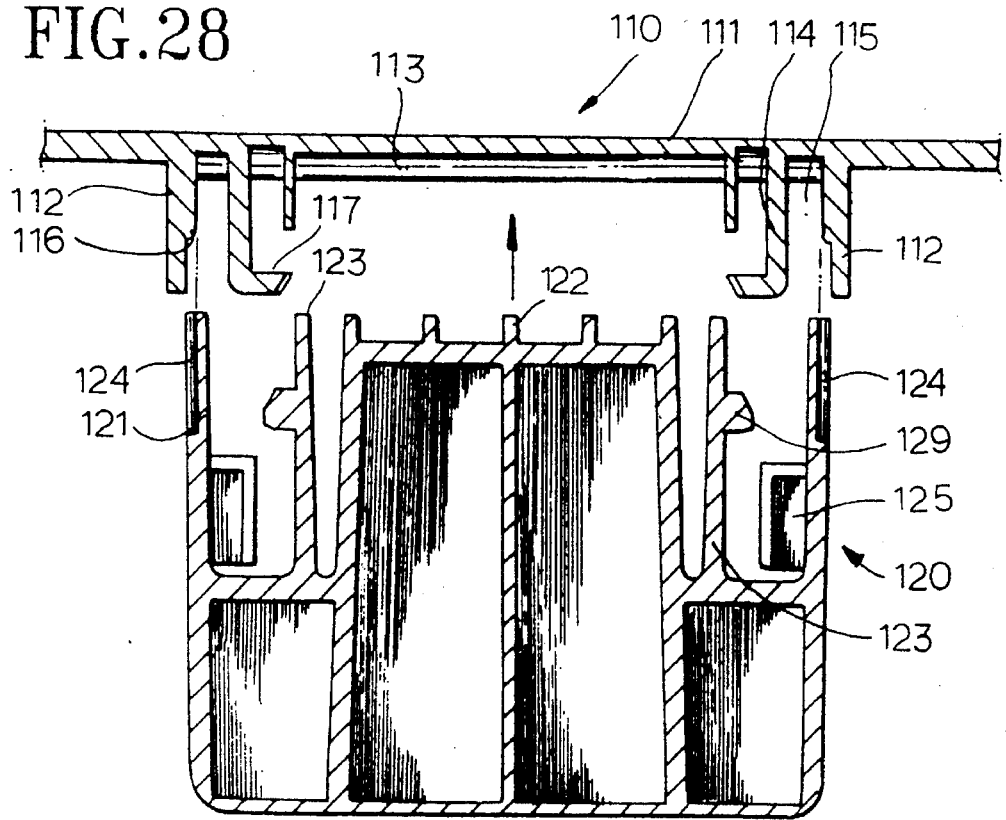
FIG. 28 is a sectional view of the monitor tilting device of FIG. 27, showing the state just before coupling of the monitor tilting means to the bracket of the monitor.
Figure 29:
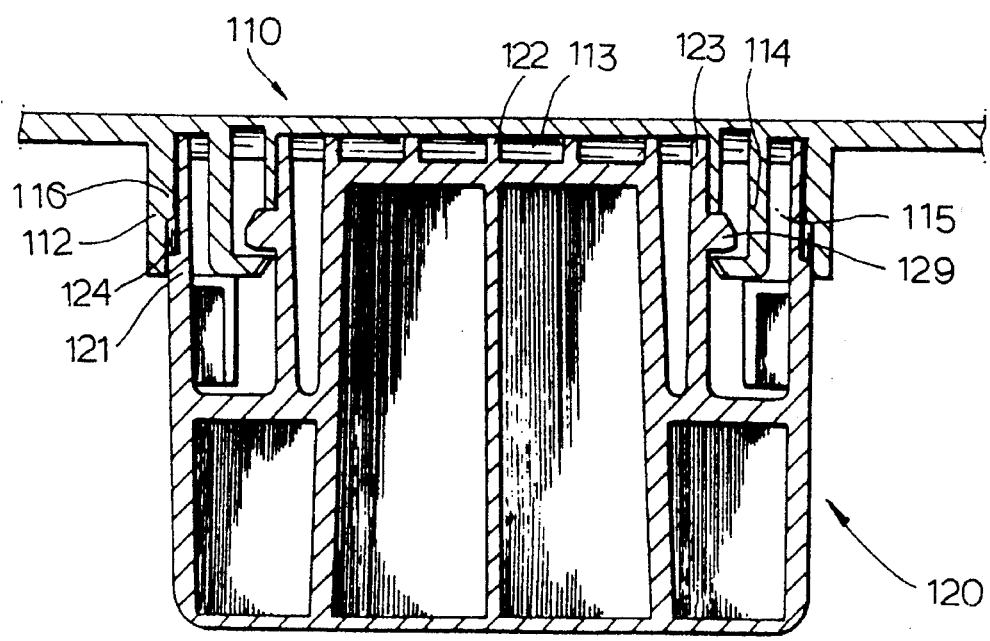
FIG. 29 is a sectional view of the monitor tilting device of FIG. 27 after the coupling of the monitor tilting means to the bracket is finished.

When the tilting means 120 is inserted into the bracket 110 as shown in FIGS. 28 and 29, the first protrusions 121 of the means 120 are inserted into individual mounting slits 115 of the bracket 110. At this time, the semicircular stepped parts 116 of the first fixtures 112 of the bracket 110 are received by the V-shaped grooves 124 of the first protrusions 121, respectively, thus to couple the monitor tilting means 120 to the bracket 110.

When the tilting means 120 is coupled to the bracket 110 as described above, the second protrusions 123 of the means 120 come into close contact with the inner upper surfaces of the second fixtures 114 of the bracket 110 due to their elasticity. In addition, the outer projections 129 of the second elastic protrusions 123 are inserted into the guide parts 117 of the second fixtures 114 of the bracket 110 in order to guide the sliding movement of the monitor tilting means 120 with respect to the bracket 110.

The center block 122 of the tilting means 120 is rotatably received by the recess 113 of the bracket 110.

Figure 30:
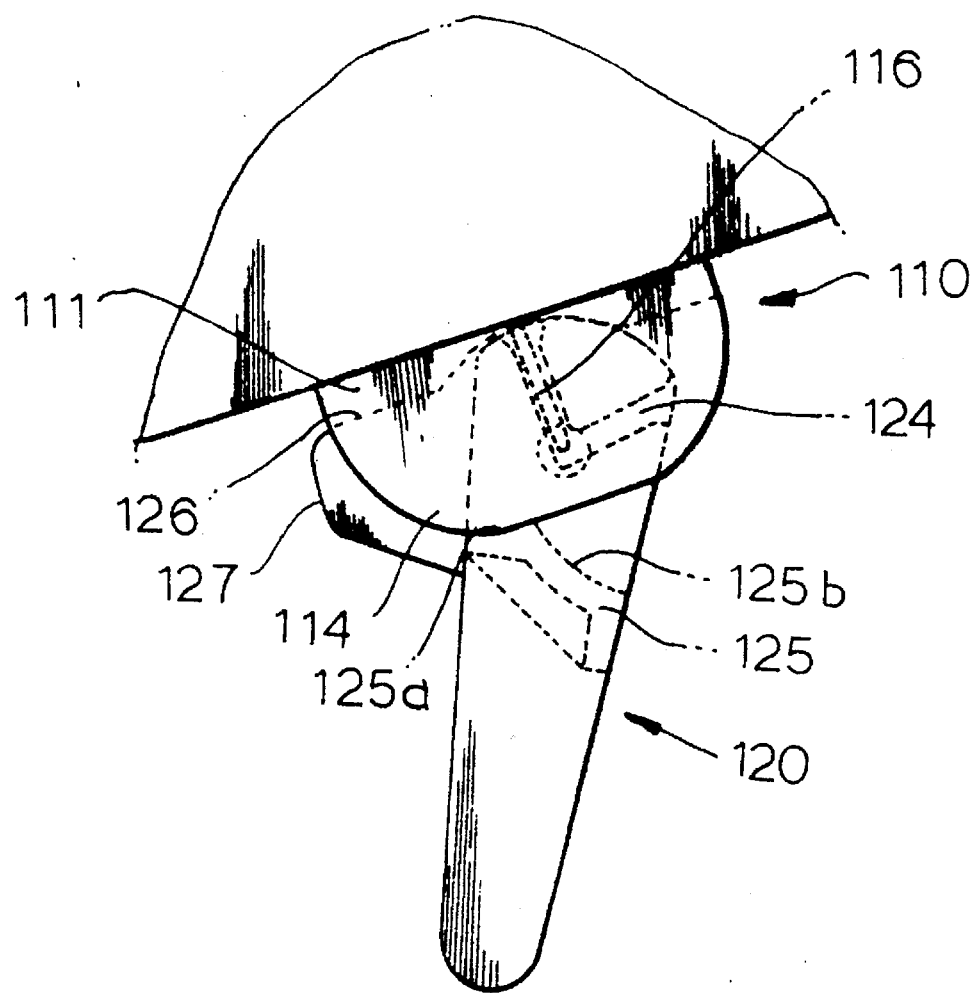
FIG. 30 is a side view of the monitor tilting device of FIG. 27 in the state of extremely leaning the monitor forwards.

FIG. 30 shows the monitor tilting device according to the fourth embodiment which is in the state that it makes the monitor be extremely leaned forwards. In this state, the semicircular stepped part 116 of the first fixture 112 is received by one side of the V-shaped groove 124 of the first protrusion 121, and the second fixture 114 of the bracket 110 is seated on the first seat 125a of the sliding part 125 (shown at the dotted line in FIG. 30) of the tilting means 120. In addition, the support legs 128 of the means 120 are leaned at their linear surface parts 126 on the lower surface of the base 111 of the bracket 110, thus to support the tilted position of the monitor.

Figure 31:
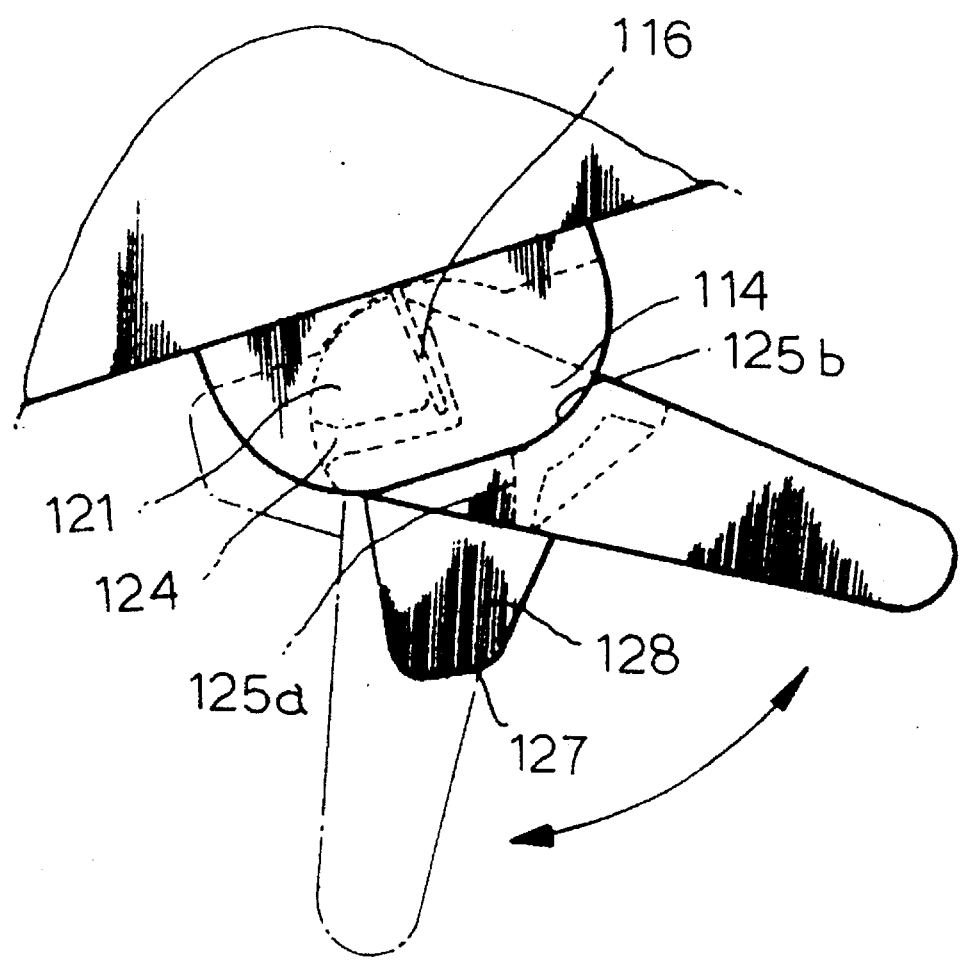
FIG. 31 is a side view of the monitor tilting device of FIG. 27 showing a monitor tilting operation for extremely leaning the monitor backwards from the state of FIG. 30.

When the monitor tilting means 120 in the state of FIG. 30 is levered backwards as shown at the solid line of FIG. 31, its first elastic protrusions 121 are elastically bent and each of the semicircular stepped parts 116 of the bracket 110 moves from the one side of the V-shaped groove 124 of the first protrusion 121 to the other side of the groove 124. At this time, since the corner of the V-shaped groove 124 is rounded, it is easy to move the stepped part 116 from the one side of the groove 124 to the other side of the groove 124. The second fixture 114 of the bracket 110 is seated on the second seat 125b of the sliding part 125 (shown at the dotted line in FIG. 31) of the monitor tilting means 120. In this state, the support legs 128 directly support the tilted position of the monitor by their inclined surface parts 127.

In accordance with the above fourth embodiment of the present invention, the second protrusions 123 of the monitor tilting means 120 are elastically bent outwards when the means 120 is inserted into the bracket 110, thus to achieve an easy coupling of the means 120 to the bracket 110. In adjustment of monitor tilting angle by the device of this embodiment, the first elastic protrusions 121 of the means 120 are elastically bent inwards by the semicircular stepped parts 116 of the bracket 110, so that the desired monitor tilting operation is easily achieved.

Figure 32:
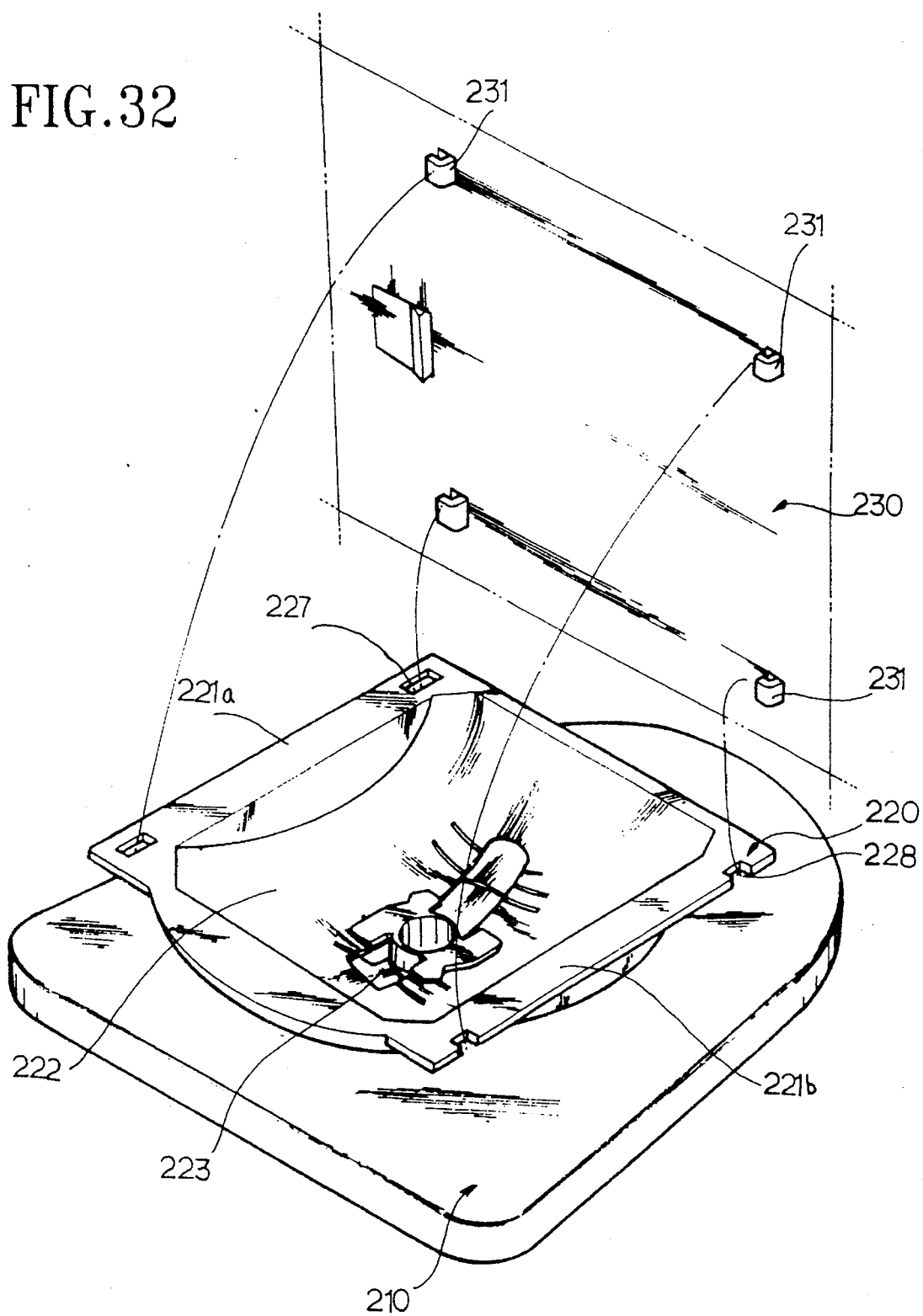
FIG. 32 is an exploded perspective view of a monitor tilting device according to the fifth embodiment of the present invention.

Turning to FIG. 32, there is shown a monitor tilting device in accordance with fifth embodiment of the present invention. In this embodiment, the monitor tilting device comprises a monitor stand 210 and a sliding washer 220 which are integrated into the device and mounted on the bottom surface of the monitor. The monitor stand 210 has a circular sliding depression 211 (FIG. 33), while the sliding washer 220 is slidably coupled to the monitor stand 210. The monitor is coupled at its bottom surface 230 to the upper surface of the sliding washer 220.

Figure 33:
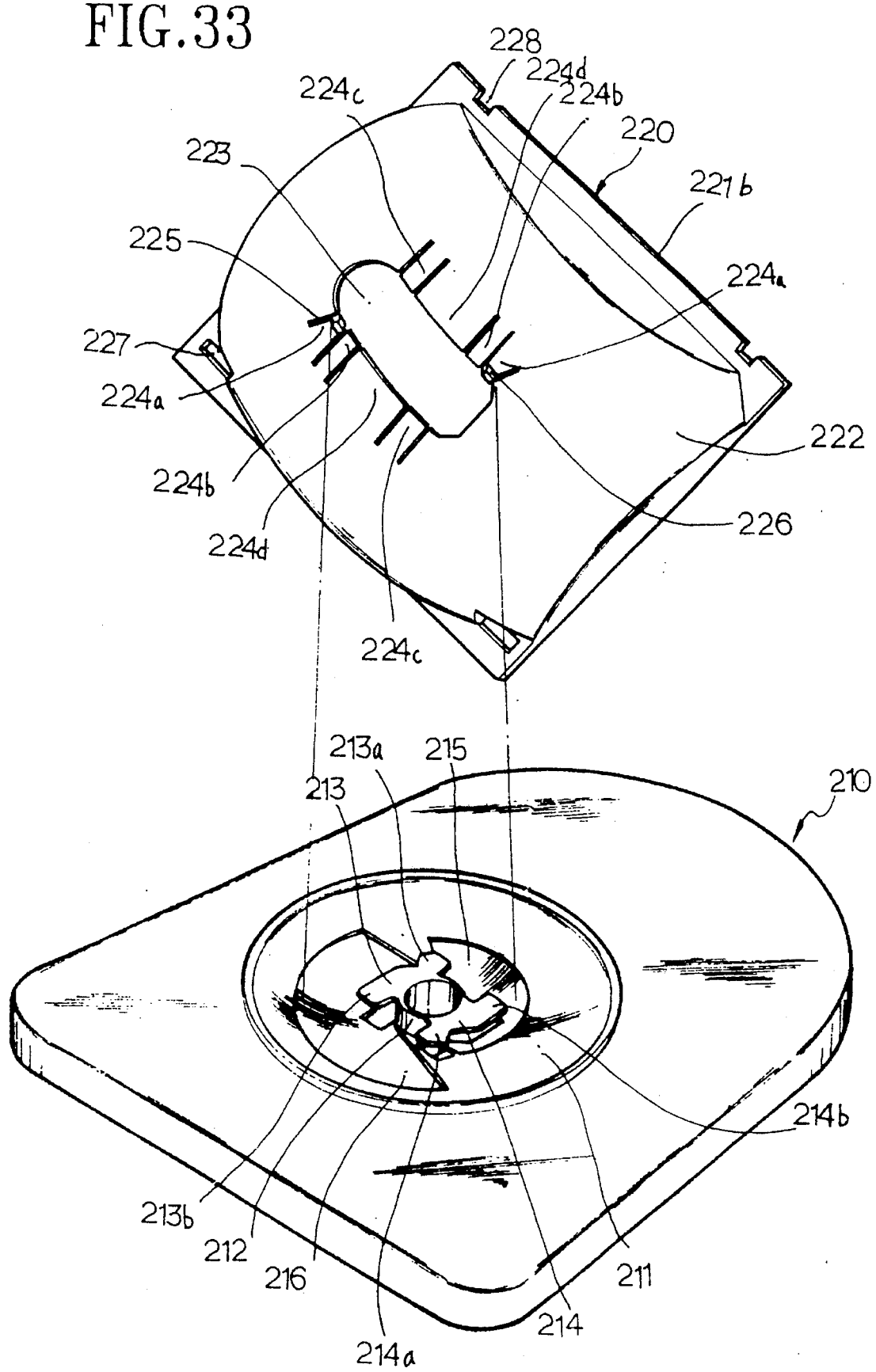
FIG. 33 is an exploded perspective view of a monitor stand and a sliding washer, which are to be slidably coupled to each other, of the monitor tilting device of FIG. 32.

As shown in FIGS. 32 and 33, an insert member 212 protrudes from the circular sliding depression 211 of the monitor stand 210. The insert member 212 is provided with an opposed pair of plates 213 and 214 which extend outwards from the opposed upper sides of the member 212. Each of the plates 213 and 214 has a first projection 213a and 213b and a second projection 214a and 214b. Here, it is preferred to arrange the first projections 213a and 214a of the plates 213 and 214 in order to be diagonally opposed to each other. In this case, the second projections 213b and 214b of the plates 213 and 214 are arranged to be diagonally opposed to each other. The insert member 212 of the sliding depression 211 is also provided with rotation limit recesses 215 and 216 at its upper section and its lower section, respectively.

Figure 34:
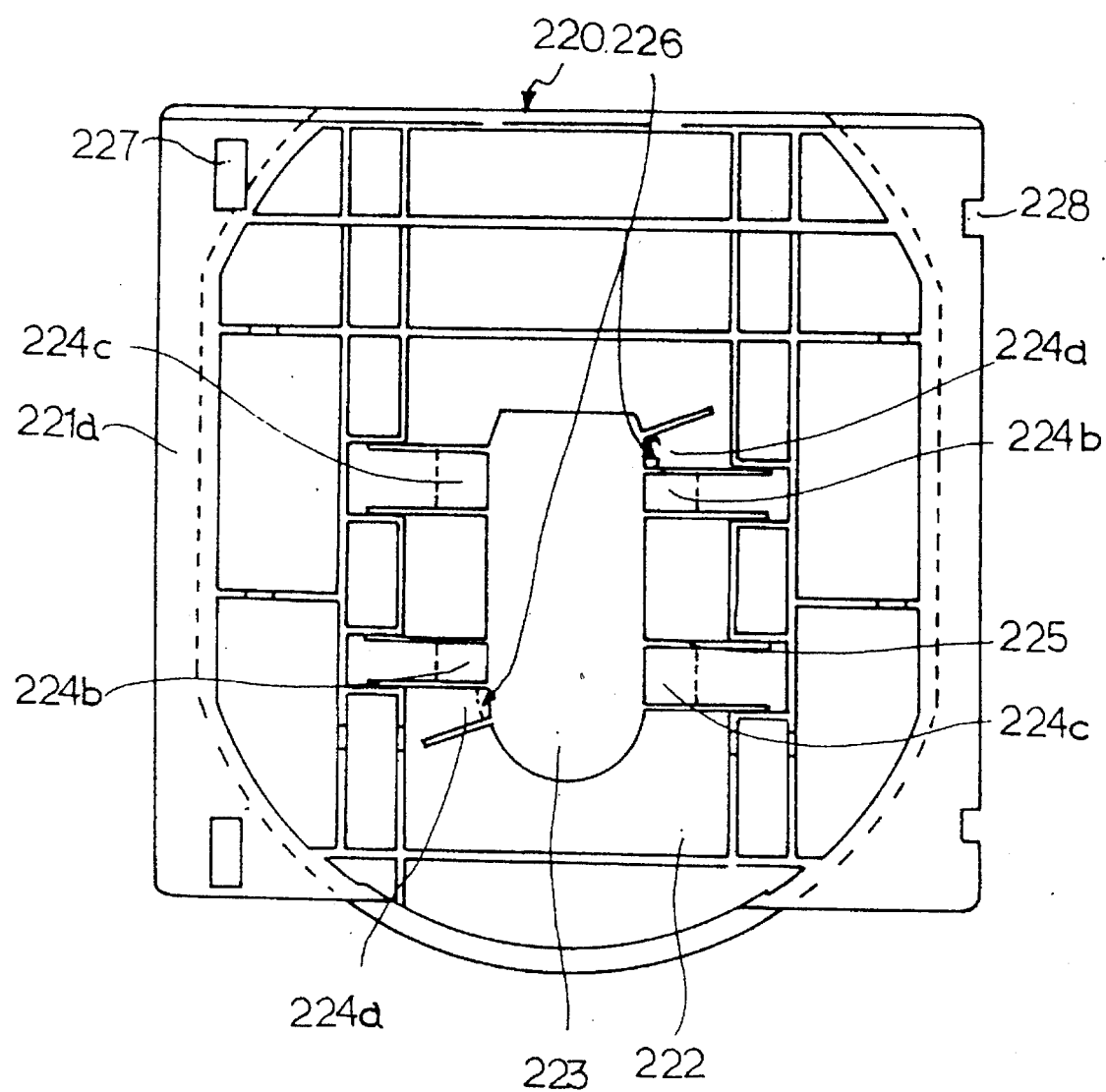
FIG. 34 is a plan view of the sliding washer of FIG. 32.

As best seen in FIGS. 32 to 34, the sliding washer 220 includes an opposed pair of flanges 221a and 221b and a dome-shaped sliding part 222 defined between the flanges 221a and 221b. The dome-shaped sliding part 222 of the sliding washer 220 is provided at its center portion with an oval-shaped opening 223 for receiving the insert member 212 of the monitor stand 210. The oval-shaped opening 223 is formed with five slits 225 at each side thereof for providing three elastic pieces, that is, a first piece 224a, a second piece 224b and a third piece 224c. Here, it is preferred to arrange the sets of slits 225 on opposed sides of the oval-shaped opening 223 such that they are opposed to each other. In addition, two rotation limit shoulders 226 is provided on a lower surface of each of the first elastic pieces 224a.

The lower surface 230 of the monitor includes four snap hooks 231 at its corners as shown in FIG. 32. The snap hooks 231 of the lower surface 230 are engaged with two locking holes 227 provided on the flange 221a and with two locking notches 228 of the flange 221b of the sliding washer 220, respectively.

Figure 35:
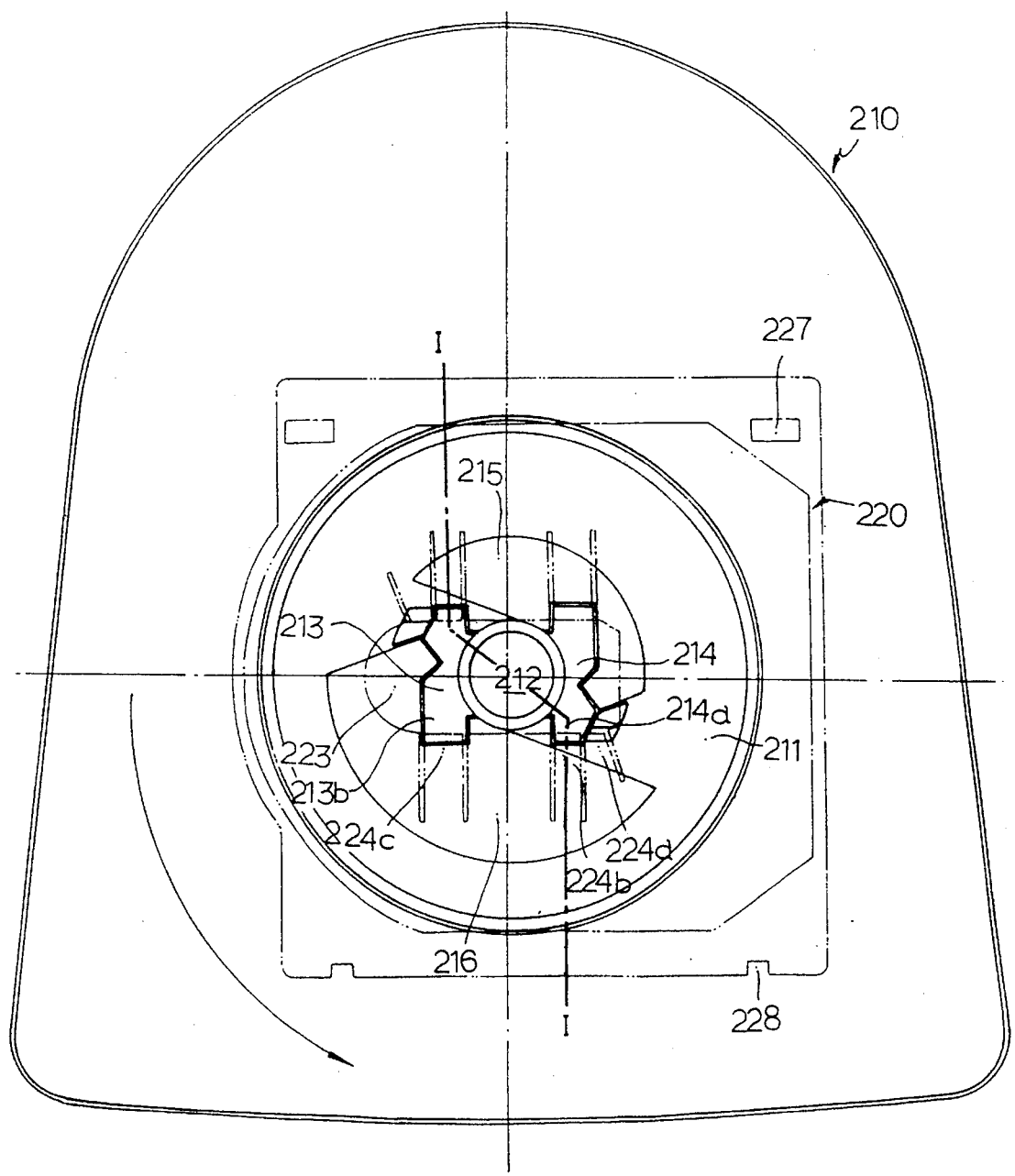
FIGS. 35A to 35C are plan views showing the process for coupling of the sliding washer to the monitor stand of FIG. 33.
Figure 35:
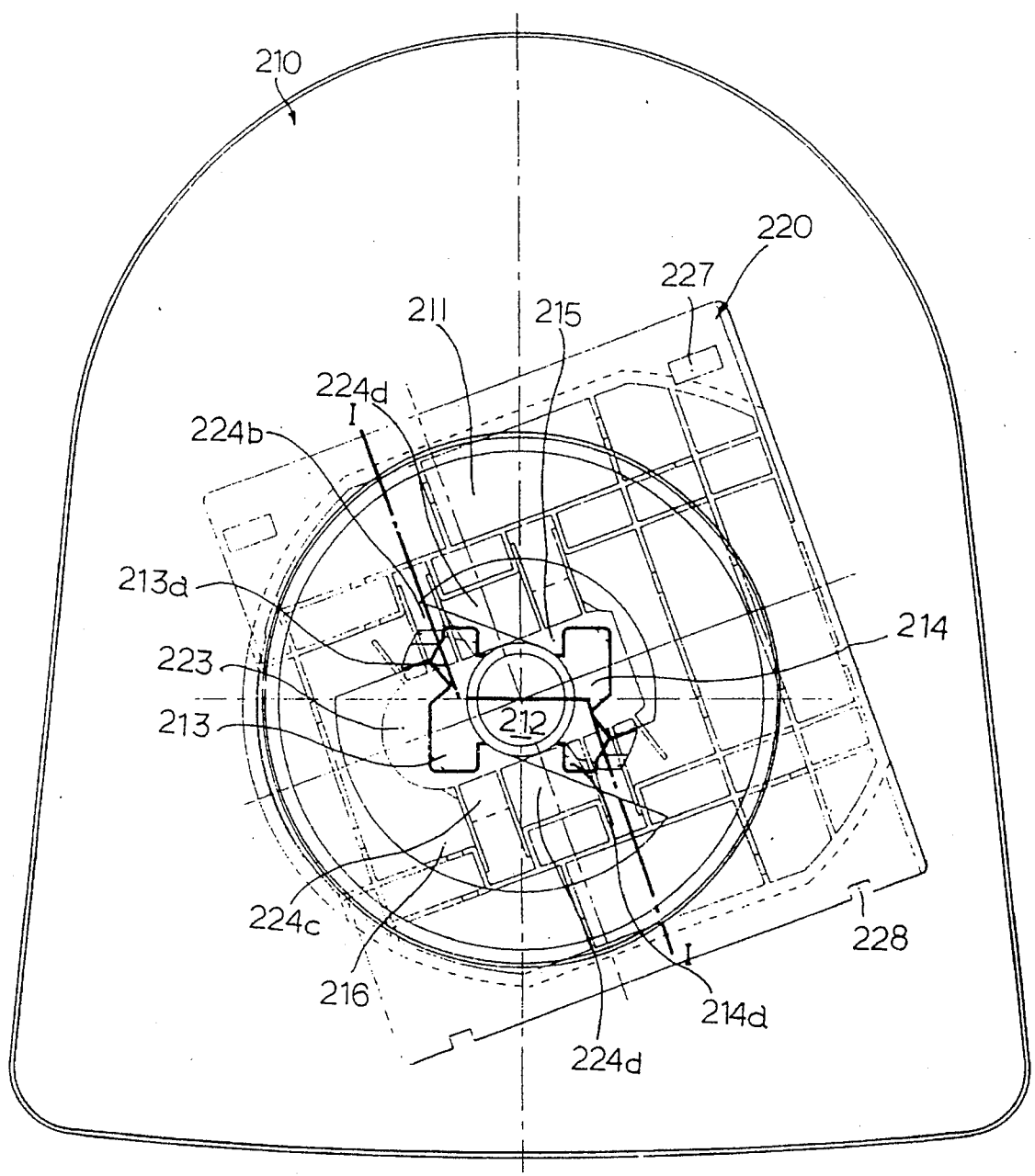
Figure 35:
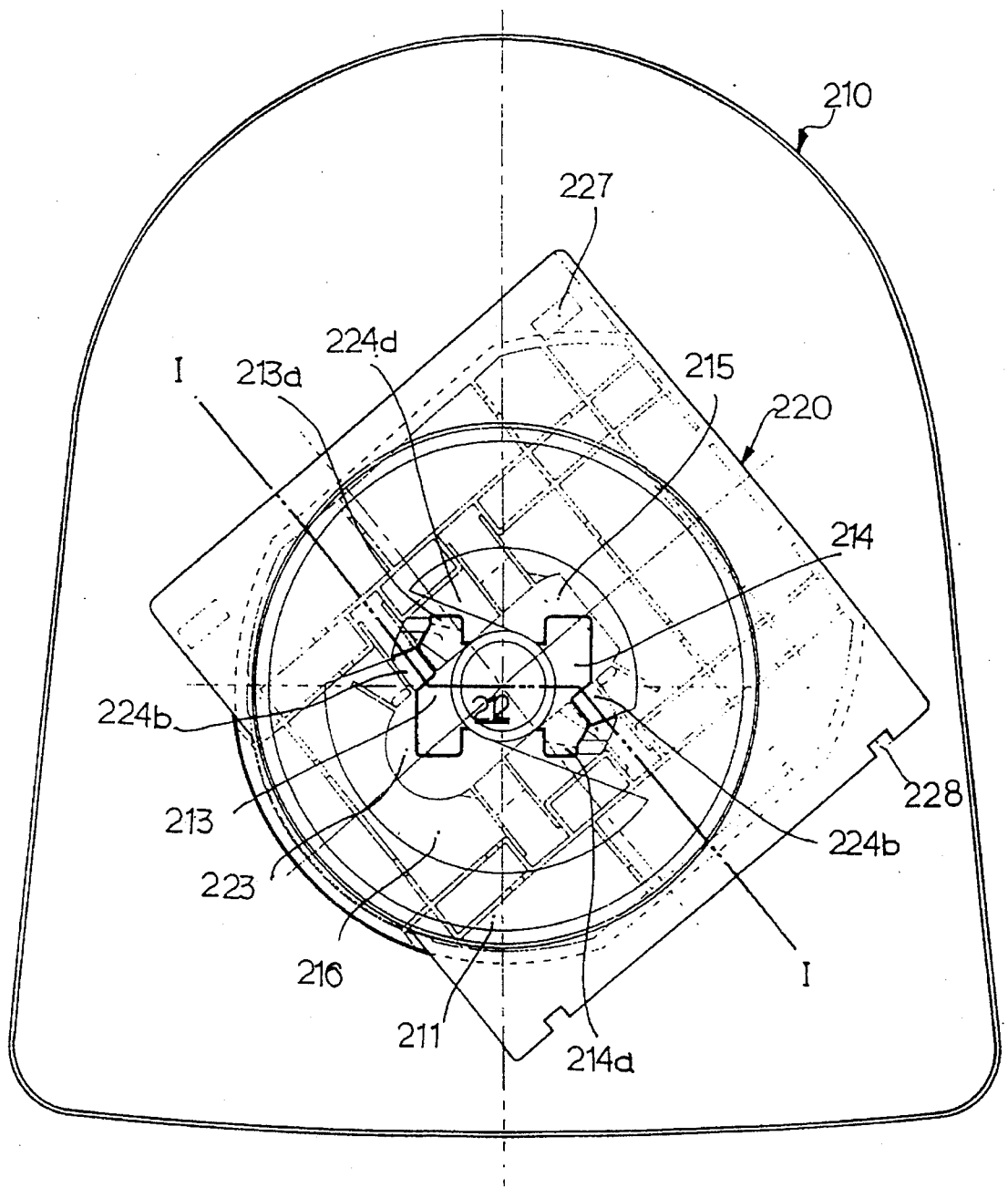
Figure 36:
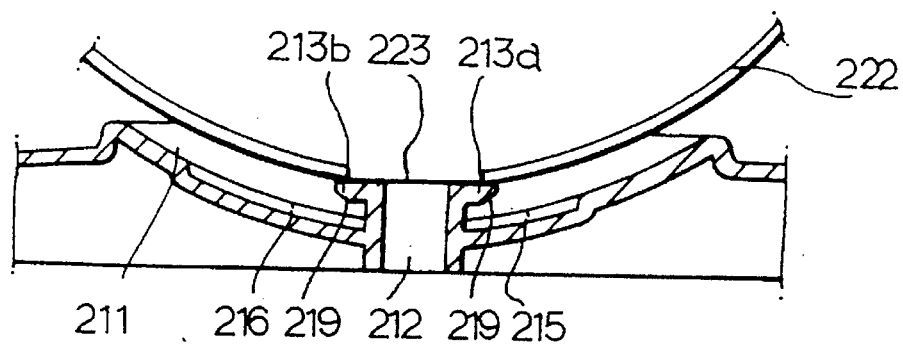
FIGS. 36A to 36C are aide sectional views of the sliding washer and the monitor stand taken along the section lines I—I of FIGS. 35A to 35C, respectively.
Figure 36:
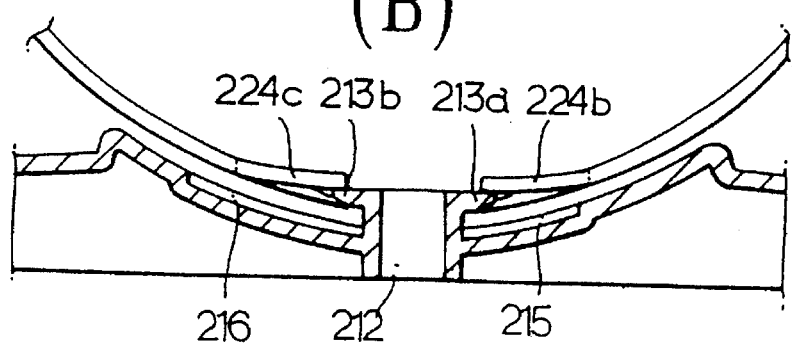
Figure 36:
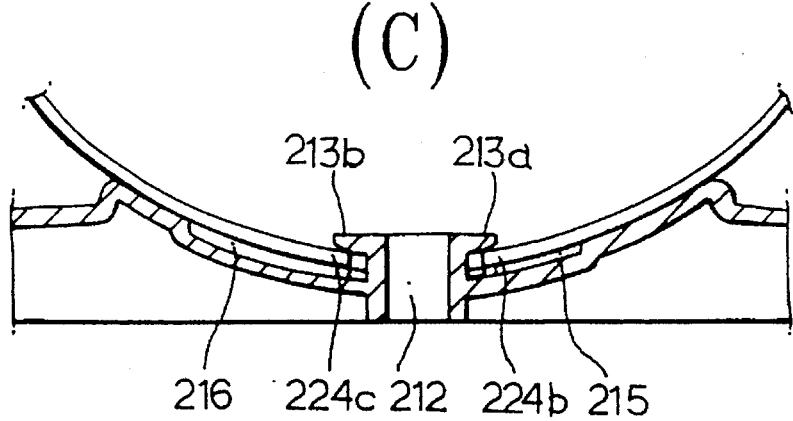

In order to fabricate the monitor tilting apparatus in accordance with the fifth embodiment of the present invention, the sliding washer 220 is laid on the monitor stand 210 such that the flange 221b having the locking notches 228 faces to the wider section of the stand 210 as shown in FIG. 35a. In this state, the major axis of the oval-shaped opening 223 of the sliding washer 220 are laterally positioned on the insert member 212 of the monitor stand 210. Thus, the second elastic pieces 224b provided on both sides of the oval-shaped opening 223 of the sliding washer 220 face to the first projections 213a and 214a of the monitor stand 210, respectively, while the third elastic pieces 224c of the sliding washer 220 face to the second projections 213b and 214b of the monitor stand 210, thus to achieve the state as shown in FIG. 36A. In this case, it is preferred to make the width between ends of the first and second projections 213a and 213b or 214a and 214b of the monitor stand 210 be slightly longer than the minor width of the opening 223.

Thereafter, the sliding washer 220 is pressed down in order to elastically bend downwards the second and third elastic pieces 224b and 224c provided on opposed sides of the opening 223 as shown in FIG. 36B. The sliding washer 220 in the state of FIG. 36B is in turn rotated in the counterclockwise direction as shown at the arrow of FIG. 35A, so that the first projections 213a and 214a of the monitor stand 210 are located on the stationary elastic pieces 224d. The first projections 213a and 214a of the monitor stand 210 are preferably cut off at their corners 219 at an angle of 45° in order to cause smooth engagement of the first projections 213a and 214a with the stationary elastic pieces 224d of the sliding washer 220 and smooth rotation of the sliding washer 220. The sliding washer 220 in the state of FIG. 35B is, thereafter, more rotated in the counterclockwise direction, thus to achieve the state shown in FIG. 35C. In this state, the second elastic pieces 224b of the monitor stand 210 return their bent state to the original state in order to be engaged with the first and second projections 213a and 213b and 214a and 214b, respectively, thus to achieve the desired coupling of the sliding washer 220 to the monitor stand 210 as shown in FIG. 36C.

When the sliding washer 220 is, thereafter, rotated in order to make the major axis of its oval-shaped opening 223 be located longitudinally, the sliding washer 220 is prevented from separation from the monitor stand 210 thanking for the first and second projections of the monitor stand 210. Thereafter, the four snap hooks 231 of the lower surface of the monitor are engaged with the locking holes 227 of the flange 221a and the locking notches 228 of the flange 221b of the sliding washer 220, thereby finishing the fabrication of the monitor tilting apparatus of the fifth embodiment.

The operational effect of the monitor tilting apparatus according to the fifth embodiment of this invention will be described hereinbelow.

Figure 37:
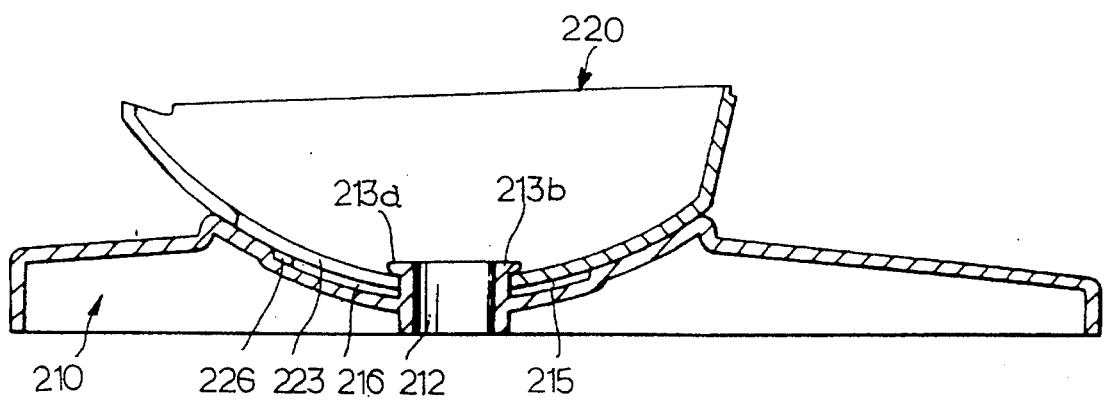
FIGS. 37A and 37B are side sectional views of the monitor having the monitor tilting device of FIG. 32 in the state of being extremely leaned backwards and being extremely leaned forwards, respectively.
Figure 37:
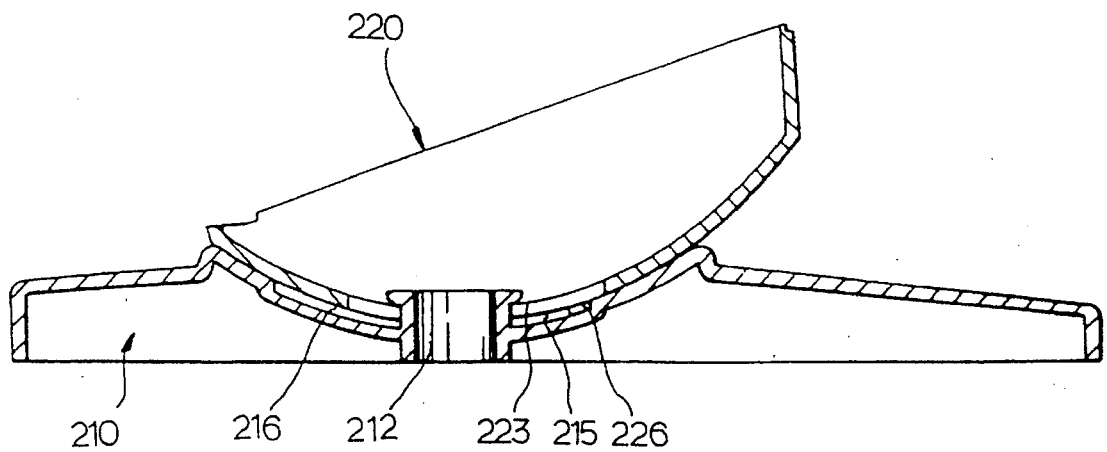

FIGS. 37A and 37B show the monitor in the state of being extremely leaned backwards and extremely leaned forwards, respectively. When the monitor in the state of FIG. 37A is pushed backwards at its lower front section, the dome-shaped sliding part 222 of the sliding washer 220 slides backwards between the plates 213 and 214, having the first projections 213a and 214a and the second projections 213b and 214b, and the sliding depression 211 of the monitor stand 210, thus rotate the monitor counterclockwise with respect to the monitor stand 210 and to lean the monitor forwards at a desired tilting angle. On the other hand, when the monitor in the state of FIG. 37B is pushed backwards at its upper front section, the dome-shaped sliding part 222 of the sliding washer 220 slides forwards between the plates 213 and 214 and the sliding depression 211 of the monitor stand 210, thus rotate the monitor clockwise with respect to the monitor stand 210 and to lean the monitor backwards at a desired tilting angle. In the monitor tilting operation of the device of this fifth embodiment, the rotation limit shoulders 226 provided on the lower surfaces of the first elastic pieces 224a of the sliding washer 220 are caught by the rotation limit recesses 215 and 216 of the sliding depression 211, so that the tilting angle of the monitor is limited within a predetermined angle.

In the monitor tilting device in accordance with the fifth embodiment of the present invention, the sliding washer is slidably coupled to the sliding depression of the monitor stand and in turn coupled to the lower surface of the monitor, thus to easily tilt the monitor at a desired tilting angle with respect to the monitor stand by simply pushing backwards the monitor at the upper front section or at the lower front section of the monitor using one hand. In addition, the monitor tilting device of this fifth embodiment is slidably coupled to the monitor stand and in turn coupled to the fully fabricated monitor, thus to simplify the fabrication process of the monitor and to reduce the cost.

While the invention has been particularly shown and described with reference to preferred embodiments thereof, it will be understood by those skilled in the art that any modification and other changes in form and details can be made therein without departing from the spirit and scope of the invention.

What is claimed is:

1. A monitor tilting device comprising:

a monitor having a bracket provided on a lower surface thereof, said bracket including:

a base formed on the lower surface of said monitor;

an opposed pair of rounded first fixtures protruding from opposed sides of said base, each of said first fixtures being provided with a semicircular stepped part on its inner surface;

a pair of rounded second fixtures, each of said second fixtures being formed inside a corresponding first fixture with a mounting slit defined therebetween, and having a guide part on a top section of its inner surface; and a center recess defined between said second fixtures; and monitor tilting means rotatably engaged with said bracket, said means including:

an opposed pair of rounded first protrusions received into said mounting slits of the bracket, each of said first protrusion having a V-shaped groove on an upper section of its outer surface and a sliding part on a middle section of its inner surface, said V-shaped groove being engaged with the semicircular stepped part of a corresponding first fixture of said bracket, said sliding part having first and second seats and cooperating with a corresponding second fixture of the bracket;

a pair of rounded second protrusions, each of the second protrusions being formed inside a corresponding first protrusion with a space therebetween for receiving a corresponding second fixture of the bracket and having an outer projection extending outwards from a middle section of its outer surface, said projection being engaged with the guide part of a corresponding second fixture of said bracket; and a center block provided between said second protrusions, said center block being rounded at its upper top in order to correspond to said center recess of the bracket and including an opposed pair of support legs extending forwards from its front surface, each of said support legs having a linear surface part and an inclined surface part.

2. The monitor tilting device according to claim 1, wherein said V-shaped groove of each of the first protrusions is rounded at its corner.

\* \* \* \* \*